US010484512B2

(12) United States Patent
Pai et al.

(10) Patent No.: US 10,484,512 B2
(45) Date of Patent: Nov. 19, 2019

(54) MANAGEMENT OF MULTI-RADIO GATEWAY DEVICE USING VIRTUAL GATEWAY DEVICE

(71) Applicant: Ayla Networks, Inc., Santa Clara, CA (US)

(72) Inventors: Vishwesh Pai, Milpitas, CA (US); Jigar Vora, San Mateo, CA (US); Sudha Sundaresan, San Jose, CA (US); Daniel Myers, Fremont, CA (US); Haoqing Geng, Sunnyvale, CA (US)

(73) Assignee: Ayla Networks, Inc., Milpitas, CA (US)

( * ) Notice: Subject to any disclaimer, the term of this patent is extended or adjusted under 35 U.S.C. 154(b) by 361 days.

(21) Appl. No.: 15/251,505

(22) Filed: Aug. 30, 2016

(65) Prior Publication Data
US 2017/0064045 A1    Mar. 2, 2017

Related U.S. Application Data

(60) Provisional application No. 62/212,450, filed on Aug. 31, 2015.

(51) Int. Cl.
*H04L 29/06*   (2006.01)
*H04W 4/70*    (2018.01)
(Continued)

(52) U.S. Cl.
CPC .............. *H04L 69/08* (2013.01); *H04L 69/18* (2013.01); *H04W 4/70* (2018.02); *H04L 49/70* (2013.01); *H04W 4/80* (2018.02)

(58) Field of Classification Search
None
See application file for complete search history.

(56) References Cited

U.S. PATENT DOCUMENTS

| 5,983,271 A * | 11/1999 | Alexander | H04L 29/06 375/222 |
| 6,091,951 A * | 7/2000 | Sturniolo | H04W 36/18 455/432.2 |

(Continued)

FOREIGN PATENT DOCUMENTS

| CN | 107018127 A | 8/2017 |
| WO | WO2002028123 A2 | 4/2002 |
| WO | 2013-181918 A1 | 12/2013 |

OTHER PUBLICATIONS

International Search Report and Written Opinion of the International Searching Authority for International application No. PCT/US16/49668 dated Jan. 13, 2017.

(Continued)

*Primary Examiner* — Scott B Christensen
(74) *Attorney, Agent, or Firm* — Lowenstein Sandler LLP

(57) ABSTRACT

A gateway device includes a first interface to connect to an internet protocol (IP) network and a second interface having a first communication protocol to connect to one or more devices. The gateway device receives an instruction to initiate an attribute update for a device from a remote server via the first interface, the first instruction having a first format. The gateway device determines the attribute update and a virtual device identifier associated with the first device from the first instruction. The gateway device determines the first communication protocol and a first device based at least in part on the first virtual device identifier. The gateway device generates a command for the first device to perform the first attribute update, the command having a second format based at least in part on the first communication protocol, and sends the command to the first device via the second interface.

20 Claims, 9 Drawing Sheets

(51) Int. Cl.
*H04W 4/80* (2018.01)
*H04L 12/931* (2013.01)

(56) References Cited

U.S. PATENT DOCUMENTS

| | | |
|---|---|---|
| 6,198,920 B1 | 3/2001 | Doviak et al. |
| 6,873,620 B1 | 3/2005 | Coveley et al. |
| 8,185,620 B1 | 5/2012 | Boone et al. |
| 8,387,112 B1 | 2/2013 | Ranjan et al. |
| 9,667,703 B1 | 5/2017 | Vetter et al. |
| 9,888,072 B2 | 2/2018 | Watts, Jr. et al. |
| 9,985,766 B2 | 5/2018 | Scholten et al. |
| 2002/0052938 A1 | 5/2002 | Kanemitsu |
| 2004/0031030 A1 | 2/2004 | Kidder et al. |
| 2004/0071148 A1* | 4/2004 | Ozaki ............... H04L 12/2805 370/401 |
| 2005/0233693 A1 | 10/2005 | Karaoguz et al. |
| 2006/0053229 A1* | 3/2006 | Choi ................ H04L 69/08 709/237 |
| 2006/0229090 A1 | 10/2006 | LaDue |
| 2007/0105531 A1 | 5/2007 | Schroeder, Jr. |
| 2007/0244999 A1 | 10/2007 | Hamanaka et al. |
| 2008/0112416 A1 | 5/2008 | Hsieh et al. |
| 2008/0189693 A1 | 8/2008 | Pathak |
| 2009/0073991 A1 | 3/2009 | Landrum et al. |
| 2009/0080400 A1 | 3/2009 | Olivier et al. |
| 2009/0182439 A1 | 7/2009 | Birze et al. |
| 2009/0235174 A1 | 9/2009 | Royt |
| 2009/0257474 A1 | 10/2009 | Tuttle |
| 2010/0045619 A1 | 2/2010 | Birnbaum et al. |
| 2010/0165876 A1 | 7/2010 | Shukla et al. |
| 2010/0165877 A1 | 7/2010 | Shukla et al. |
| 2010/0169467 A1 | 7/2010 | Shukla et al. |
| 2010/0205596 A1 | 8/2010 | Chung et al. |
| 2011/0149932 A1 | 6/2011 | Kim et al. |
| 2011/0276668 A1 | 11/2011 | Fang et al. |
| 2012/0311181 A1* | 12/2012 | Smith ................ H04L 12/403 709/238 |
| 2013/0082826 A1 | 4/2013 | Chandra et al. |
| 2013/0086245 A1* | 4/2013 | Lu ................ H04L 12/2807 709/223 |
| 2013/0272317 A1 | 10/2013 | Matsumura |
| 2014/0006354 A1 | 1/2014 | Parkison et al. |
| 2014/0007076 A1 | 1/2014 | Kim et al. |
| 2015/0010159 A1 | 1/2015 | Tran et al. |
| 2015/0040115 A1 | 2/2015 | Capper |
| 2015/0074259 A1 | 3/2015 | Ansari et al. |
| 2015/0110119 A1 | 4/2015 | Aubert et al. |
| 2015/0143462 A1 | 5/2015 | Li et al. |
| 2015/0163196 A1 | 6/2015 | Bhagwat et al. |
| 2015/0264138 A1 | 9/2015 | Watts, Jr. et al. |
| 2015/0365217 A1 | 12/2015 | Scholten et al. |
| 2016/0014787 A1 | 1/2016 | Zhang et al. |
| 2016/0095044 A1 | 3/2016 | Maria |
| 2016/0255066 A1 | 9/2016 | Green et al. |
| 2016/0285759 A1* | 9/2016 | Ryan ................ H04L 45/74 |
| 2016/0330140 A1 | 11/2016 | Cook et al. |
| 2016/0337206 A1 | 11/2016 | Bugenhagen et al. |
| 2017/0026157 A1 | 1/2017 | Bugenhagen et al. |
| 2017/0039058 A1 | 2/2017 | Zhu et al. |
| 2017/0054594 A1 | 2/2017 | Decenzo et al. |
| 2017/0063968 A1 | 3/2017 | Kitchen et al. |
| 2017/0064042 A1 | 3/2017 | Vora et al. |
| 2017/0111153 A1 | 4/2017 | Scholten et al. |
| 2017/0111227 A1 | 4/2017 | Papageorgiou et al. |
| 2017/0244635 A1* | 8/2017 | Felemban ............ H04L 45/745 |

OTHER PUBLICATIONS

International Search Report and Written Opinion of the International Searching Authority for International application No. PCT/US16/49501 dated Dec. 30, 2016.
USPTO, Non-Final Office Action for U.S. Appl. No. 15/250,596 dated Jun. 12, 2018.

* cited by examiner

MANAGEMENT OF MULTI-RADIO GATEWAY DEVICE USING VIRTUAL GATEWAY DEVICE

RELATED APPLICATIONS

The present application claims the benefit of U.S. Provisional Patent Application No. 62/212,450 filed Aug. 31, 2015, which is incorporated by reference herein.

BACKGROUND

Gateway devices are devices that interconnect networks with different network protocol technologies by performing protocol conversions between the different network protocol technologies.

BRIEF DESCRIPTION OF THE DRAWINGS

Reference will now be made to the accompanying drawings showing example embodiments of the present application, and in which.

DETAILED DESCRIPTION

Figure 1:
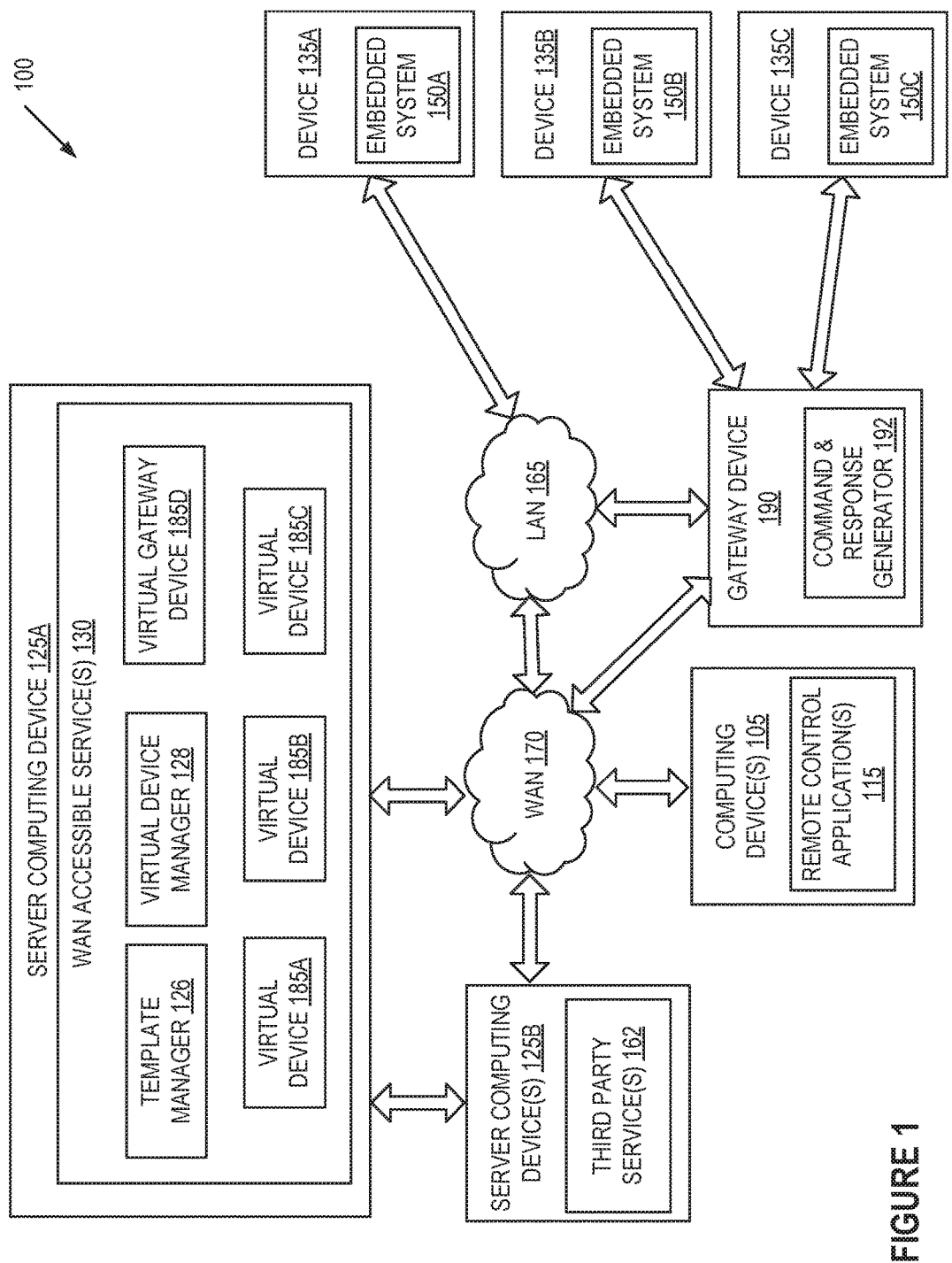
FIG. 1 is a block diagram depicting an example network architecture including remotely accessible devices and computing devices that interact with the remotely accessible devices.

Embodiments are directed to a network-connected device platform (also referred to as an internet-of-things (IoT) cloud platform or simply an IoT platform) that implements a virtual gateway device to control a gateway device and devices managed by the gateway device. A device may have many properties or attributes that can be controlled by a user and many properties or attributes that may be used for monitoring and data collection purposes. Some devices do not have network interfaces for connecting to an internet protocol (IP) network (e.g., do not include a Wi-Fi® network adapter or an Ethernet network adapter). Multi-radio gateway devices that may act as ZigBee® gateways, Bluetooth® gateways, and so on may interconnect such devices to an IP network and through the IP network to a server computing device of the network-connected device platform. Embodiments described herein provide a gateway model in which a virtual gateway device running in the cloud (e.g., on a server computing device) generates instructions in a standardized (e.g., generic) format and a physical gateway device translates between the standardized or generic instructions and specific commands and communication protocols used for controlling endpoint devices.

In embodiments, gateway devices maintain a mapping between protocol agnostic identifiers (also referred to as virtual device identifiers or serial device numbers (SDNs)) assigned to devices and used by the IoT cloud platform (e.g., by a virtual gateway device) and protocol specific unique device identifiers used by the gateway devices. The gateway devices may additionally include firmware that defines types of devices that may be managed by the gateway device, the device attributes of these devices, and/or how to communicate with or control these devices. The gateway devices also may include a local data storage with information on a local network of devices managed by the gateway devices (e.g., including information on all of the local devices managed by the gateway, how to communicate with these devices, capabilities (e.g., device attributes) of these devices, etc.). A gateway device may receive standardized instructions from a virtual gateway device that are directed to a unique virtual device identifier. The gateway device may then translate the unique device identifier into a protocol specific device identifier to identify a device that the instructions are directed to, and further translate the generic or standardized instructions into a specific command appropriate to the device.

A flexible templating framework may use one or multiple device templates to define and generate a virtual gateway device for a physical gateway device and virtual devices for each of the devices managed by the physical gateway device. Each template is a model of a device (or a component, feature or feature set of a device) that captures the physical and behavioral attributes or properties of the device. The terms device attributes and device properties will be used interchangeably herein. The virtual devices may inherit the device attributes of each of the templates used to generate the virtual devices. Thus, if a new type of device is to be added to a network, support for the new device may be added by adding one or more new templates to the templating framework, and in some instances by updating a firmware of the gateway device. The new templates may then be used to update or generate the virtual gateway device and to generate a virtual device for the new type of device.

In one embodiment, a server computing device receives a message from a gateway device after the gateway device connects to a remote device, the message including device attributes of the remote device and a device identifier of the remote device. The server computing device determines device templates that define the device attributes and creates a virtual device from the device templates, wherein the virtual device inherits the device attributes from the device templates. In some instances, the server computing device may additionally determine a device template to use for updating a virtual gateway device that will manage the device (and the virtual device). The server computing device assigns a unique virtual device identifier to the device and associates the virtual device identifier to the device identifier. The server computing device then notifies the gateway device of the virtual device identifier assigned to the device.

In another embodiment, a gateway device receives an instruction from a remote server to initiate an attribute update for a device managed by the gateway device, the instruction having a first format (e.g, a generic format) that is not associated with a communication protocol used by the device. The gateway device determines the attribute update and a virtual device identifier associated with the first device from the first instruction, wherein the virtual device identifier is used by the remote server to uniquely identify the device. The gateway device determines the communication protocol and a device identifier used by the gateway device to uniquely identify the device based at least in part on the virtual device identifier. The gateway device determines a command that will cause the device to perform the attribute update and generates the command for the device. The command may have a second format based at least in part on the communication protocol and/or a device type of the device. The gateway device then sends the command to the device.

Referring now to the figures, FIG. 1 is a block diagram depicting an example network architecture 100 including remotely accessible devices 135A-C and computing devices 105, 125A, 125B that interact with the remotely accessible devices 135A-C. The network architecture 100 includes the multiple devices 135A-C connected to a local area network (LAN) 165. Thus, the devices 135A-C may be referred to as network-connected devices. Some of the devices 135B-C lack connectivity to an internet protocol (IP) network, and thus connect to the LAN 165 and computing devices 105, 125A, 125B via a gateway device 190.

In one embodiment, the devices 135A-C are devices with embedded systems 150A-C, and may include, for example, electrical appliances such as refrigerators, ovens, washers, driers, dishwashers, thermostats, alarms, power strips, air conditioners, televisions, radios, receivers, amplifiers, and so forth. The devices 135A-C may also include consumer devices such as digital watches, music players, game consoles, digital cameras, printers, and so forth. Other examples of devices 135A-C include stationary devices such as HVAC systems, traffic lights, factory controllers, signs, electronic billboards, sprinkler systems, and irrigation control systems, as well as medical devices. The embedded systems 150A-C may also be referred to as network-connected devices. Devices 135A-C may also be any other type of device that includes an embedded system. Alternatively, one or more devices 135A-C may not include an embedded system.

An embedded system 150A-C is a class of computing device that is embedded into another device as one component of the device. The device 135A-C typically also includes other hardware, electrical and/or mechanical components that may interface with the embedded system 150A-C. Embedded systems 150A-C are typically configured to handle a particular task or set of tasks, for which the embedded systems 150A-C may be optimized. Accordingly, the embedded systems 150A-C may have a minimal cost and size as compared to general computing devices.

The embedded systems 150A-C may each include a communication module (not shown) that enables the embedded system 150A-C (and thus the device 135A-C) to connect to LAN 165, to gateway device 190, or to a wireless carrier network (e.g., that is implemented using various data processing equipment, communication towers, etc.). The communication module may be configured to manage security, manage sessions, manage access control, manage communications with external devices, and so forth.

In one embodiment, the communication module of embedded system 150A is configured to communicate using Wi-Fi® or another internet protocol (IP) such as Ethernet (e.g., 10 Megabyte (Mb), 100 Mb and/or 1 Gigabyte (Gb) Ethernet). Communication modules may also be configured to communicate with a wireless carrier network using Global Systems for Mobile Communications (GSM), Code-Division Multiple Access (CDMA), Universal Mobile Telecommunications Systems (UMTS), 3GPP Long Term Evaluation (LTE), Worldwide Interoperability for Microwave Access (WiMAX), or any other second generation wireless telephone technology (2G), third generation wireless telephone technology (3G), fourth generation wireless telephone technology (4G) or other wireless telephone technology.

The LAN 165 includes a router, switch, bridge or other network device (not shown) that enables communication between multiple devices connected to the LAN 165. The network device may provide wired connections to the LAN using, for example, Ethernet ports, universal serial bus (USB) ports and/or Firewire® ports. The network device may additionally provide wireless connections to the LAN using, for example, a Wi-Fi transceiver.

Some embedded systems 150B-C may not support any of the communication types supported by the network device. In one embodiment, the communication modules of embedded systems 150B-C do not include IP network adapters (e.g., Wi-Fi adapters or Ethernet adapters), and are not capable of directly connecting to LAN 165. Instead, the communication modules of embedded systems 150B-C may be configured to communicate using Bluetooth®, ZigBee®, power line communication (PLC), Z-Wave®, building automation and control networks (BACnet), or other communication protocols. For example, device 135B may support ZigBee and device 135C may support Bluetooth. ZigBee is a collection of wireless mesh network protocols. Bluetooth is a frequency-hopping spread spectrum (FHSS) wireless communication protocol that uses short-wavelength ultra-high frequency (UHF) radio waves in the industrial, scientific and medical (ISM) radio band from 2.4 to 2.485 GHz. To enable devices that lack IP network connectivity to connect to the LAN 165, the LAN 165 includes gateway device 190 connected to the network device via one of the connection types supported by the network device (e.g., via Ethernet or Wi-Fi). Alternatively, the network device of the LAN 165 and the gateway device 190 may be combined into a single device.

In addition to supporting TCP/IP protocols, the gateway device 190 may additionally support other communication protocols such as ZigBee, BACnet, Z-Wave, PLC and/or Bluetooth, and may translate between supported communication protocols. Accordingly, some devices (e.g., devices 135B-C) may connect to the LAN 165 and/or to the WAN 170 through the gateway device 190. In one embodiment, gateway device 190 includes one or more IP network adapters (e.g., Wi-Fi adapters, Ethernet adapters, etc.) and multiple types of non-IP network adapters (e.g., one or more network adapters for ZigBee communications, one or more network adapters for Bluetooth communications, and so on). The gateway device 190 may manage a network of devices that includes multiple devices 135B-C that share a common communication protocol or include multiple devices 135B-C having distinct communication protocols.

The LAN 165 (or wireless carrier) is connected to a wide area network (WAN) 170. The WAN 170 may be a private WAN (e.g., an intranet) or a public WAN such as the Internet, or may include a combination of a private and public network. The LAN 165 may include a router and/or modem (e.g., a cable modem, a direct serial link (DSL) modem, a Worldwide Interoperability for Microwave Access (WiMAX®) modem, an long term evolution (LTE®) modem, etc.) that provides a connection to the WAN 170.

The WAN 170 may include or connect to one or more server computing devices 125A-B. The server computing devices 125A-B may include physical machines and/or virtual machines hosted by physical machines. The physical machines may be rackmount servers, desktop computers, or other computing devices. In one embodiment, the server computing devices 125A-B include virtual machines managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

Server computing device 125A hosts one or more WAN accessible services 130, which may be a web based service and/or a cloud service (e.g., a web based service hosted in a cloud computing platform). A WAN accessible service 130 may maintain a session (e.g., via a continuous or intermittent connection) with one or more of the embedded systems 150A-C. Alternatively, the WAN accessible service 130 may periodically establish sessions with the embedded systems 150A-C. Sessions and connections may be between a virtual device 185A-C running on the server computing device 130 and the devices 135A-C. Sessions and connections may also be established between a virtual gateway device 185D running on the server computing device 130 and gateway device 190. Communications between virtual devices 185B-C and devices 135B-C may be facilitated by virtual gateway device 185D and gateway device 190.

Via a session with an embedded system 150A-C (or device 135A-C), WAN accessible service 130 may use an appropriate virtual device 185A-C to issue commands to the embedded system (or device 135A-C) and/or receive status updates from the embedded system (or device 135A-C). Thus, the virtual device 185A-C may be used to control the device 135A-C. The commands may be commands to change a state of one or more properties or attributes of a device controllable by the embedded system. For example, if the embedded system is embedded in a heater or thermostat, then the commands may include commands to increase or decrease a temperature. In another example, if the embedded system is embedded in a home automation system, then the commands may include commands to turn on or off lights.

Status updates received from the embedded systems 150A-C may identify values or states of some or all detectable properties or attributes of devices 135A-C that the embedded systems are included in. A property (also referred to as an attribute) may be represented as a name-value pair (also referred to as a key-value pair). The name/key represents a property, and the value represents a status of the property. Status updates may also include fault information, statistical device usage information, trace data and/or other information. Such values, states and/or other information may change based on direct user interaction with the devices. Such values, states and/or other information may also change responsive to commands sent to the embedded systems 150A-C by the WAN accessible service 130 and/or by computing devices 105 via an appropriate virtual device 185A-C. Moreover, values, states and other information of the embedded systems 150A-C may change based on environmental conditions of the embedded systems. By maintaining or periodically establishing sessions with the embedded systems 150A-C, the WAN accessible services 130 may maintain up-to-date information on the devices 135A-C, and such up-to-date information may be reflected in a virtual device 185A-C.

In one embodiment, the virtual gateway device 185D and gateway device 190 enable communication between the virtual devices 185B-C and the devices 135B-C that are connected to LAN 165 via gateway device 190. If a change of an attribute or parameter is initiated on a virtual device 185B-C, the virtual device notifies the virtual gateway device 185D. The virtual gateway device 185D may then generate an instruction for the gateway device to initiate the change of the attribute or property on the corresponding device 135B-C, and may send the instruction to the gateway device 190. Alternatively, virtual gateway device 185D or another module of WAN accessible services 130 may initiate a change of an attribute or parameter of a device 135B-C, and may generate and send an instruction to gateway device 190.

A generated instruction may include an attribute update and a virtual device ID (e.g., a DSN). The attribute update may be a standardized or generic update having a standardized format that is the same for all devices, whether or not those devices are managed by a gateway device. Thus, an attribute update generated for device 136A may have the same format as an attribute update generated for gateway device 190 to implement on devices 1368 and 136C. The attribute update may have the form of a key value pair, where key represents a property, and the value represents a new status of the property. In one embodiment, the instruction is a string. For example, the instruction may be a Javascript object notation (JSON) encoded string that can be parsed and decoded by gateway device 190.

Gateway device 190 may contain firmware that defines types of devices that may be managed by the gateway device, the device attributes of these devices, and/or how to communicate with or control these devices. The gateway device 190 also may include a local data storage with information on a local network of devices managed by the gateway device (e.g., including information on devices 135B-C, how to communicate with these devices, capabilities (e.g., device attributes) of these devices, commands accepted by these devices, etc.). Accordingly, responsive to gateway device 190 receiving an instruction from virtual gateway device 185D, a command and response generator 192 of gateway device 190 parses and/or decodes the instruction. The instruction may include an attribute update (e.g., key value pair) that has a standardized format. The attribute update may not be executable on the device 135B-C.

Command and response generator 192 may determine a device ID (also referred to as a physical device ID) for the device based on the virtual device ID. Command and response generator 192 may additionally determine a communication protocol used by the device based on the virtual device ID. Command and response generator 192 may then generates a command to cause the device to perform the attribute update. The command may be generated using local command data and/or other managed device data. The generated command may be specific to the device and/or to the attribute to be updated, and is executable by the device 135B-C to perform the attribute update. The command may have a format associated with a communication protocol used to communicate with the device 135B-C. Command and response generator 192 may then send the command to the device 135B-C using the determined communication protocol.

In an example, gateway device 190 includes information that identifies devices 135B-C as particular types of ZigBee devices that each include one or more specified ZigBee clusters. For example, gateway device 190 may include a local data storage (e.g., a database) that identifies device 135B as a ZigBee smart plug device with a device serial number (DSN) and a specific MAC address. The data storage may additionally indicate which clusters are included in device 135B. Thus, gateway device 190 may use this information to translate an instruction to perform a particular attribute update that includes an attribute ID and a virtual device ID into a particular command (e.g., command 1) directed to a specific device ID (e.g., a specific MAC address of the device) and a cluster ID for an appropriate cluster of the device (e.g., cluster 6). The command may additionally include a value associated with the command (if the command accepts a value). The physical gateway device 190 may then send the command to the specific MAC address of the ZigBee device.

In an alternative embodiment, the virtual gateway device 185D may translate the virtual device ID into the physical device ID, and the instruction sent to the gateway device 190 may include the physical device ID of the device to be updated as well as the attribute update having the standardized format. In such an embodiment, the gateway device 190 does not translate the virtual device ID into the physical device ID. However, the other operations performed by the gateway device 190 would be as described above.

An instruction sent to gateway device 190 may include a unique instruction identifier, which may be a random value, a monotonically increasing numerical value, or some other value. Gateway device 190 may wait for a response to the sent command from the device 185B-C. Gateway device 190 may then generate a new response having a standardized format used to communicate with virtual gateway device 185D, and may send the new response to virtual gateway device 185D.

Virtual gateway device 185D may wait for confirmation that the attribute or parameter of the device has been updated before causing a corresponding attribute of a corresponding virtual device 185B-C to be updated. Alternatively, the virtual device 185B-C may be updated before receiving confirmation that the attribute has been updated on the physical device (referred to as a "best effort" implementation). If the appropriate virtual device 185B-C has not yet been updated, virtual gateway device 185D updates the virtual device after receiving the response.

In some instances, a state change for a property or attribute of a device 135B-C may be originated on the device itself (e.g., if a user manually turns on or off the device). In such an instance, the device 135B-C sends a notice of the changed attribute/property to the gateway device 190. The notice may have a specific format based on a communication protocol used to send the notice. Command and response generator 192 may generate a new notice that abstracts the notice into an attribute update format that is not device specific, and that replaces the device ID of the device into a virtual device ID associated with the device. Command and response generator 192 may then transmit the notice to virtual gateway device 185D.

In one embodiment, WAN accessible services 130 include a template manager 126 and a virtual device manager 128. The template manager 126 creates, modifies and otherwise manages a pool of device templates. Template manager 126 may generate and/or modify templates without users performing any programming. In one embodiment, template manager 126 provides a user interface (e.g., a graphical user interface) that enables users to easily define device attributes in a device template.

Each device template defines one or more attributes/properties for a device 135A-C or gateway device 190. The attributes may be physical attributes that are hard wired, hard coded or manufactured into the device 135A-C or gateway device 190. Examples of such physical attributes include sensors and sensor capabilities, input devices (e.g., buttons) and operations of the input devices, output devices (e.g., speakers, a display, etc.) and operations of the output devices, servos and servo settings, motors and motor settings, and so forth. Physical attributes may additionally include capabilities, behaviors, characteristics, etc. of firmware and/or software that is loaded into the devices 135A-C (e.g., into embedded systems 150A-C) or gateway device 190.

Each device template additionally defines one or more logical or behavioral attributes for a device 135A-C or gateway device 190. Logical attributes (also referred to as behavioral attributes) may include business logic such as behaviors, notifications, rules, access control, derived properties, and so forth that may not be programmed into a device. The logical attributes may instead be provided by a virtual device 185A-C or virtual gateway device 185D on behalf of a physical device 135A-C or physical gateway device 190.

In an example, a thermostat 135A-C controlled by gateway device 190 may include temperature set points and controls for changing the temperature set points. A virtual device 185A-C established for the thermostat may include a rule stating that a temperature minimum of 70 degrees Fahrenheit is to be applied at 7:00 AM on weekdays. The virtual device may change the temperature set point to 70 degrees Fahrenheit internally and may send a request to the virtual gateway device 185D to forward an associated instruction to gateway device 190 indicating a virtual device ID and an attribute update. Gateway device 190 may translate the instruction into a command to change the set point to 70 degrees Fahrenheit, and send the command to the physical device 135A-C using a MAC address or other device identifier of the physical device. In this example, the temperature set point and the controls usable to set the temperature set point would be considered physical attributes of the physical device 135A-C, and the rule for controlling when to change the temperature set point would be considered a logical attribute assigned to the physical device 135A-C.

The template manager 126 additionally associates templates to devices 135A-C and/or gateway device 190. In one embodiment, template manager 126 associates each type of device with a particular template or combination of templates. A device type may include a particular manufacturer (OEM), a particular model number and/or a particular version number (e.g., a firmware version number). Thus, different templates may be used based on manufacturer, device model and/or firmware version.

Virtual device manager 128 generates an instance of a virtual device 185A-C for each physical device 135A-C and an instance of virtual gateway device 185D for gateway device 190. The physical devices 135A-C may each have the same device type or may have different device types from the same or different manufacturers. For example, a separate virtual device 185A-C may be created for each unit of a particular product of an OEM.

Each virtual device 185A-D is generated from one or a set of device templates. The created virtual device 185A-D inherits device attributes from each of the device templates used to create the virtual device. The virtual device 185A-D is then paired to a particular physical device 135A-C, 190 (e.g., to an embedded system 150A-C of a particular physical device 135A-C), and may be used to monitor, interface with, and control that physical device. For devices 135B-C that are managed by gateway device 190, the virtual device 185B-C may connect to virtual gateway device 185D, virtual gateway device 185D may connect to gateway device 190, and gateway device 190 may connect to the devices 135B-C.

Server computing devices 125B include one or more third party services 162. Third party services 162 may be services provided by entities other than a provider of an IoT platform that includes WAN accessible services 130. As shown, server computing devices 125B may connect to server computing device 125A directly or via WAN 170. Examples of third party services include weather services (e.g., that provide live weather feeds), time services (e.g., an atomic clock), a rich site summary (RSS, also known as really simple syndication) feed, earthquake data for an area (e.g., usable to shut off utilities in the event of a large earthquake), an OEM hosted service that keeps track of customer payments (e.g., usable to turn off device controls if payment is not received), and so on. For actions involving external services, a user may enter their credentials or go through an authorization procedure to provide authorization to perform actions on the user's behalf with regards to the external services.

Virtual devices 185A-D may interface with third party services 162 on behalf of associated physical devices 135A-C and/or gateway device 190. Virtual devices 185A-D may interface with the third party services 162 to obtain information usable to update the devices. Additionally, virtual devices 185A-D may interface with the third party services 162 to provide notifications and information about physical devices 135A-C and/or gateway device 190.

Computing devices 105 may include portable devices such as electronic book readers, portable digital assistants, mobile phones, laptop computers, portable media players, tablet computers, cameras, video cameras, netbooks, notebooks, and the like. Computing devices 105 may also include traditionally stationary devices such as desktop computers, gaming consoles, digital video disc (DVD) players, media centers, and the like. Computing devices 105 may connect to the WAN 170 and/or to the LAN 165.

Computing devices 105 may include a remote control application (or multiple remote control applications) 115 that can receive information for devices 135A-C and control the devices 135A-C via virtual devices 185A-C and/or virtual gateway device 185D. The remote control application 115 is configured to interface with one or more virtual devices 185A-C, and may issue commands to the connected virtual devices 185A-C using a single standardized command interface. The standardized command interface may not be device specific. In other words, the same interface may be used regardless of the type of device to be controlled or the communication protocols or underlying technology used by the device. The virtual devices 185A-C may then generate instructions having a standardized format and send the instructions to associated physical devices 185A-C.

For devices 135B-C controlled by gateway device 190, the corresponding virtual devices 185B-C may generate a request and send the request to virtual gateway device 185D. Virtual gateway device 185D may generate an instruction having the standardized format for the gateway device 190. The instruction may include a virtual device ID and an attribute update. The attribute update may have a standardized format that is usable for all device types and for all types of attributes.

Command and response generator 192 may parse the instruction to determine the virtual device ID and the attribute update (e.g., a key value pair representing an attribute update). Command and response generator 192 may then translate the virtual device ID into a physical device ID (e.g., a MAC address), and may additionally translate the standardized attribute update into a specific command that will cause the specific property of the specific device to be updated. Accordingly, command and response generator 192 translates from standardized attribute updates that could not be executed by a physical device into specific commands that are executable by the physical device. The gateway device 190 may then send the command to the physical device 135B-C (e.g., via the devices' embedded systems 150B-C) via the communication protocol used by that device to control the physical device 135B-C.

The remote control application 115 may be programmed to run on various operating systems, such as Windows® operating systems, Unix® operating systems, iOS® operating systems, Android® operating systems and Java® operating systems to name a few. The remote control application 115 may also be configured as software, firmware, or as hardware, or as some combination of software, firmware, and/or hardware. The remote control application 115 may include a graphical user interface (GUI) that enables users to interact with and control devices 135A-C in an intuitive and user-friendly manner. A user may interact with the GUI to cause the remote control application to generate notifications, commands, property updates and other messages for the devices represented in the GUI.

Computing device 105 may connect to server computing device 125A and control virtual devices 185A-D via the connection. These virtual devices may then control physical devices 135A-C and gateway device 190. Additionally, if computing device is connected to LAN 165, then the remote control application 115 may enter a LAN mode, and may connect to gateway device via the LAN 165, bypassing the server computing device 125A. This may reduce lag in instances where the computing device 105 is connected to LAN 165. In one embodiment, remote control application 115 automatically switches to LAN mode 115 responsive to connecting to LAN 165.

The WAN accessible services 130 and/or remote control application 115 may include a visualizer (not shown) that can generate a graphical representation of a network of devices managed by gateway device 190. For a ZigBee mesh network, the graphical representation may show how each device in the ZigBee mesh network is connected to each other device. The graphical representation may show an accurate depiction of the states of all devices on the network based on the states of the virtual devices 185A-C. Thus, an accurate graphical representation can be provided without querying the gateway device 190.

Figure 2:
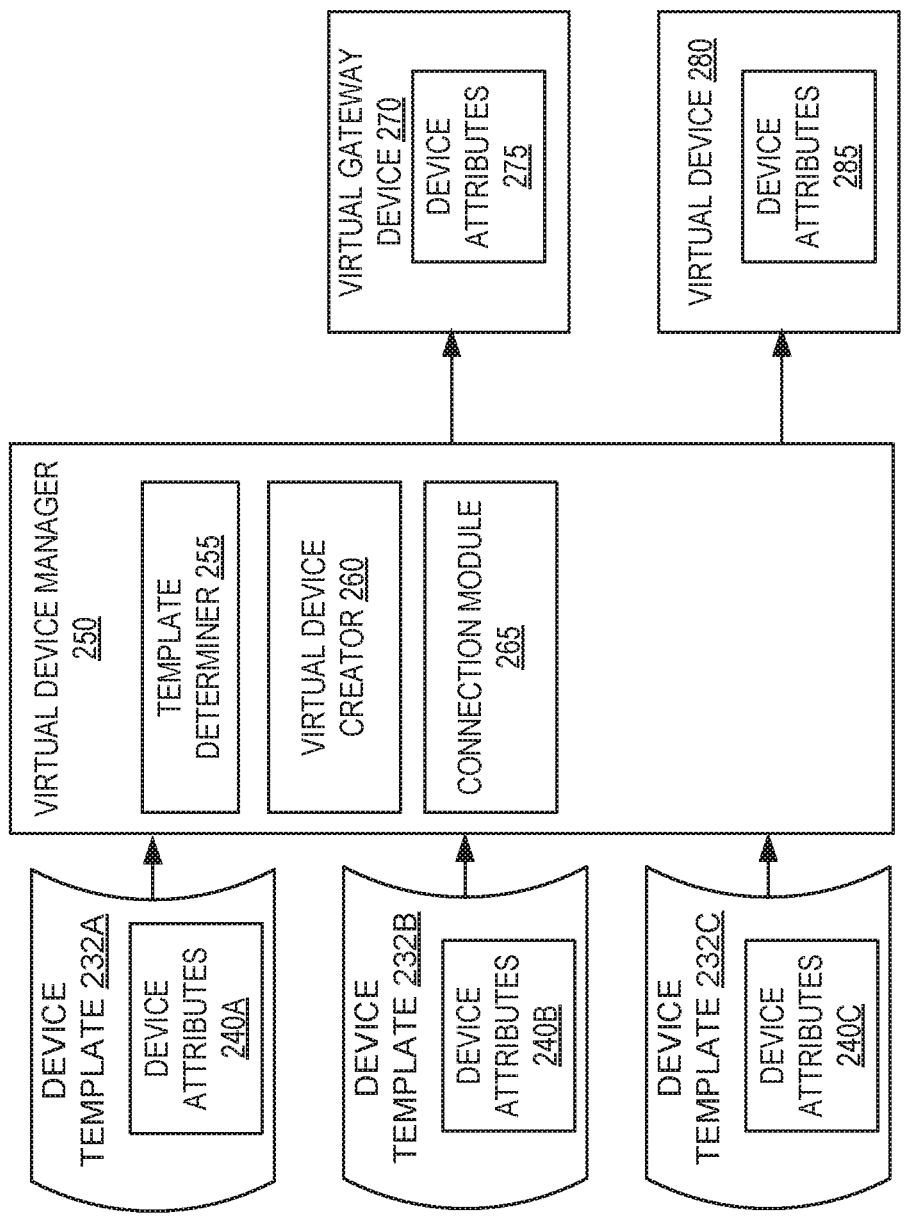
FIG. 2 is a block diagram of a virtual device manager, in accordance with one embodiment of the present invention.

FIG. 2 is a block diagram of a virtual device manager 250, in accordance with one embodiment of the present invention. In one embodiment, virtual device manager 250 corresponds to virtual device manager 128 of FIG. 1. Virtual device manager 250 includes functionality for creating virtual devices and connecting virtual devices together and to physical devices. The virtual device manager 250 includes a template determiner 255, a virtual device creator 260 and a connection module 265. Alternatively, the functionality of the template determiner 255, virtual device creator 260, and/or connection module 265 may be divided into additional modules or may be combined into a single module.

When a gateway device is connected to a network, that gateway device may send a message to virtual device manager 250 notifying virtual device manager 250 of that gateway device. The notification may include information identifying a particular device model, an OEM, a version number, a media access control (MAC) address, a serial number, a network address of the gateway device, etc. The notification may also identify each type of communication protocol that the gateway device uses to manage remote devices (e.g., ZigBee, Bluetooth, etc.) and/or other information.

Template determiner 255 may use the provided information to determine a device type for the gateway device. Template determiner 255 may additionally determine which device templates 232A-C are associated with that device type, where each of the device templates 232A-C includes different device attributes 240A-C. Template determiner 255 may then invoke virtual device creator 260 and pass to virtual device creator 260 the network address of the gateway device and an identification of the device templates 232A-C associated with that gateway device.

Virtual device creator 260 generates a virtual gateway device 270 from the identified device templates 232A-C associated with the gateway device. The virtual gateway device 270 may be a data structure that mimics the physical gateway device. The virtual gateway device 260 inherits device attributes 240A-C from the device templates 232A-C, which together make up device attributes 275. The device attributes 275 may include a superset of attributes that the physical gateway device actually has (e.g., of physical device attributes). For example, device attributes 275 may additionally include logical device attributes that are implemented by a server computing device on behalf of the gateway device. The fact that some operations of the gateway device are performed on the server (e.g., in the cloud), and that other operations are actually performed on the physical gateway device may be transparent to end users. Once the virtual gateway device 270 is created, connection module 265 connects the virtual gateway device 270 to the physical gateway device.

When a physical device to be managed by a gateway device first connects to the gateway device (e.g., initiates commissioning for ZigBee or pairing for Bluetooth), that physical device may send a message to the gateway device that includes information identifying the device and all attributes of the device. In one embodiment, the gateway device interrogates the device, asking for identification of all attributes of the device. The gateway device may then commission or pair to the physical device, which may include adding information about the device to local managed device data. The gateway device may additionally send the information about the new physical device to virtual gateway device 270 using an API provided by virtual gateway device 270. The same API may be used to report the device information regardless of the type of device and the communication protocol used to connect to the device. The information may include information identifying a particular device model, an OEM, a version number, a unique device identifier of the device based on the protocol supported by the device (e.g., a media access control (MAC) address, a serial number, a network address of the physical device, etc.), and so forth. The unique device identifier may be the identifier or address used by the physical gateway device to refer to the device. The contents of the information may depend on a type of device and a communication protocol used by the device. For example, the information received from a device that communicates using ZigBee may be different from the information received from a device that communicates using Bluetooth. However, the information reported to the virtual gateway device 270 may have the same format regardless of the type of device that was discovered.

In the example of a ZigBee device, the device would be interrogated using the ZigBee protocol, and would identify one or more clusters that define the ZigBee device. The ZigBee specification provides standards for different ZigBee clusters. For example, a ZigBee device may respond that it is defined by clusters 5, 6 and 7. The virtual gateway device, upon receiving such information, may record the information about the new ZigBee device.

Template determiner 255 may use the provided information to determine a device type for the device. Template determiner 255 may additionally determine which device templates 232A-C are associated with that device type. Template determiner 255 may then invoke virtual device creator 260 and pass to virtual device creator 260 the first unique identifier of the device and an identification of the device templates 232A-C associated with that device.

Virtual device creator 260 generates a virtual device 280 from the identified device templates 232A-C associated with the device. Thus, the virtual device 285 inherits device attributes 285 from the device templates 232A-C associated with the device. Virtual device creator 260 may additionally generate a unique virtual device identifier (e.g., a device serial number (DSN)) for the virtual device 280. The unique virtual device identifier (ID) may be the identifier or address used by a WAN accessible service to refer to the virtual device 280. The virtual device 280 may be a data structure that mimics the physical device. A separate virtual device with a unique DSN is created for each physical device controlled by the gateway device.

The virtual device ID may be a random value, a monotonically increasing numerical value, an alphanumeric value, a name, or some other value. A standardized format may be used for the virtual device identifiers, regardless of device type or a communication protocol used by the device. Accordingly, a single standardized addressing mechanism may be used for all devices, whether those devices are managed by a gateway device or connect to WAN accessible services without the help of a gateway device.

The virtual gateway device 270 is updated to indicate that the virtual gateway device 270 controls or manages the virtual device. This may include adding information about the virtual device and/or associated physical device to a network table of the virtual gateway device 270. Such information may include, for example, the unique virtual device identifier of the virtual device and/or the device ID of the associated physical device. The virtual gateway device 270 may additionally report the virtual device identifier to the gateway device, which may store the virtual device identifier along with the device identifier (also referred to as a physical device identifier) of the physical device in a table or map. Future communications between the virtual gateway device 270 and the gateway device may then refer to the device using the virtual device identifier.

In one embodiment, virtual device manager 250 additionally notifies a remote control application of the new virtual device and/or associated device. The notice may include the virtual device ID of the virtual device. The remote control application, which may run on a mobile device, may then use the virtual device ID to control the virtual device and the associated physical device.

The example of a ZigBee virtual gateway device will now be described. ZigBee is a specification for a suite of high level wireless mesh network communication protocols used to create personal area network (PANs). For simplicity, ZigBee will be described herein as a single protocol, though it should be understood that it is actually a suite of communication protocols. ZigBee devices can transmit data over long distances by passing data through a mesh network of intermediate devices to reach more distant ones. A ZigBee gateway device may connect a ZigBee device to an IP network even though the gateway device is not directly connected to that ZigBee device. Instead, the ZigBee gateway may be connected to an intermediate ZigBee device, which may connect to the ZigBee device via a mesh network.

For ZigBee, each ZigBee device is defined by one or more clusters. Clusters are defined by the ZigBee alliance and specification. Each cluster represents one or more functionalities and is made up of one or more attributes and commands associated with the one or more attributes. The commands are usable to adjust values of the one or more attributes of the cluster. Some example types of functionality include on/off functionality (boolean data type), temperature functionality (integer type), power and metering functionality, and so on. For example, a ZigBee smart plug could implement an On/Off cluster, which contains a single attribute for the On/Off status and three commands, including an on command, an off command and a toggle command.

The IoT platform may include a different device template for each cluster. Such device templates may be referred to herein as cluster templates. Cluster templates are made of up the attributes and commands of a particular cluster. For example, the on/off cluster in the ZigBee specification contains attribute 0x0000, which is for on/off status, and the three commands of on, off and toggle. The on/off cluster template may be defined in a similar manner.

Typically a ZigBee device (also referred to as a ZigBee node) is made up of multiple clusters. In such an instance, template determiner 255 determines which clusters are associated with a ZigBee device and select the corresponding cluster templates for those clusters. Virtual device creator 260 then dynamically merges the multiple cluster templates into a virtual device. For example, suppose that a ZigBee smart plug implements the clusters on/off, basic and over-the-air (OTA). When the ZigBee smart plug device is commissioned (added) onto the network, the gateway interrogates the node to determine the clusters that define the node, and forwards this information to the virtual ZigBee gateway. Virtual device creator 260 merges an on/off ZigBee cluster template, a basic ZigBee cluster template and an OTA ZigBee cluster template to create a virtual ZigBee smart plug. In one embodiment, these three cluster templates are merged to form a ZigBee smart plug template. When a new ZigBee smart plug device is detected, this single ZigBee smart plug template may be used to generate a new virtual ZigBee smart plug device in the cloud.

Figure 3:
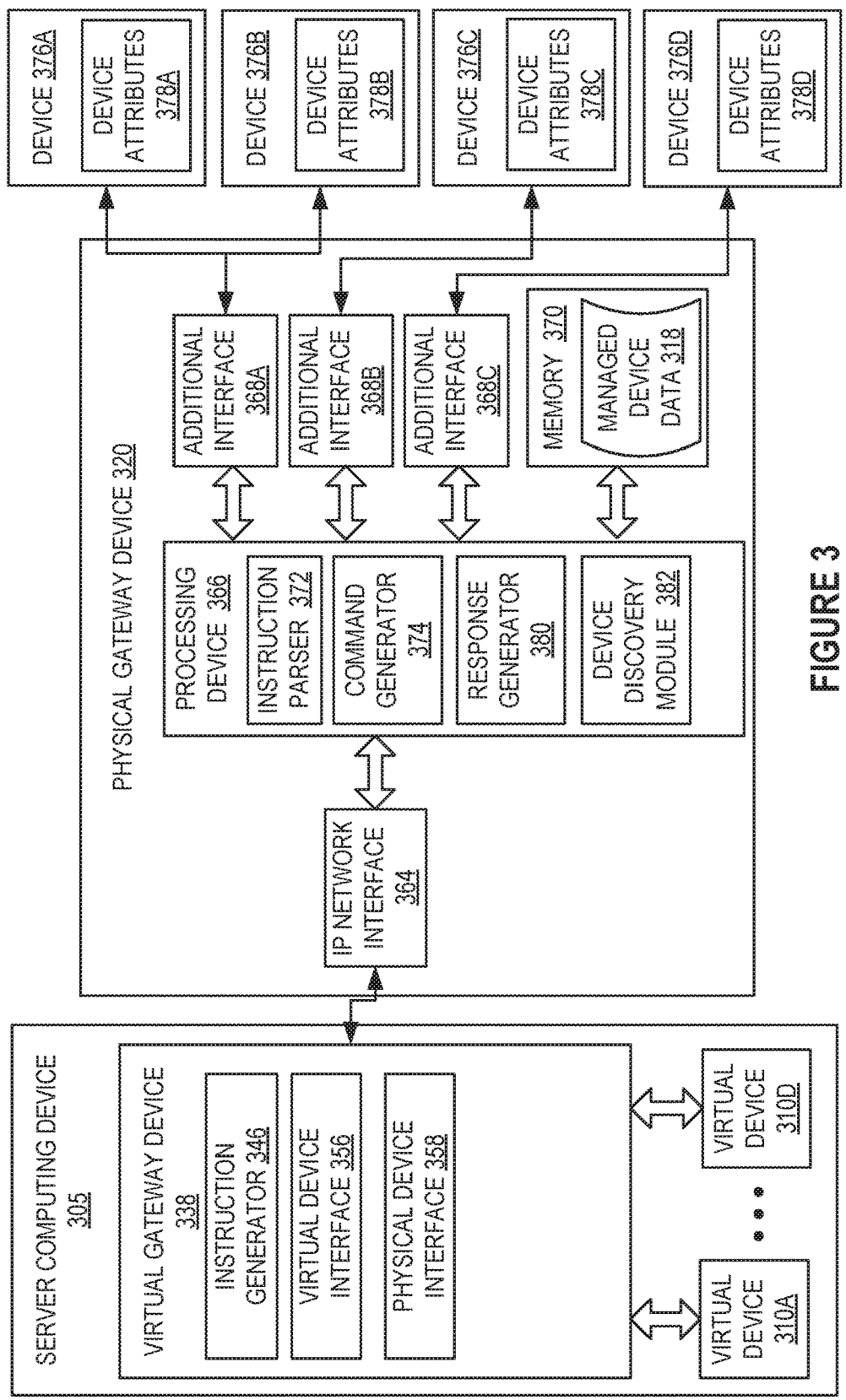
FIG. 3 is a block diagram depicting a virtual gateway device that interfaces with a physical gateway device that manages remotely accessible devices.

FIG. 3 is a block diagram depicting interactions between a physical gateway device 320 and a virtual gateway device 338 that is a virtual representation of the physical gateway device 320. The physical gateway device 320 manages multiple devices 376A-D. A server computing device 305 hosts virtual gateway device 338 as well as multiple virtual devices 310A-D (310B-C not shown) managed by virtual gateway device 338. In one embodiment, devices 376A-D initially perform a pairing or commissioning procedure to add the device to a network managed by the physical gateway device 320, which causes corresponding virtual devices 310A-D to be generated by server computing device 305 and connected to virtual gateway device 338.

Virtual gateway device 338 may include all of the physical attributes of the physical gateway device 320 as well as logical attributes that the physical gateway device 320 may not inherently possess. Examples of such logical attributes include derived properties, notification rules, business logic (e.g., roles, additional rules, registration techniques, etc.), and so on. In one embodiment, virtual gateway device 338 includes an instruction generator 346, a virtual device interface 356 and a physical device interface 358. Alternatively, the functionality of one or more of the instruction generator 346, virtual device interface 356 and/or physical device interface 358 may be merged into a single module or divided into additional modules.

Virtual device interface 356 receives messages from virtual devices 310A-D and sends messages to virtual devices 310A-D. For example, a user may instruct a virtual device 310A-D to update an attribute (e.g., may instruct it to turn on, to turn off, to change a setting, and so on). In response, the virtual device 310A-D may generate a request for the virtual gateway device 338 to cause the corresponding physical device to perform the same attribute update. Alternatively, a user may interact with a device 376A-D directly to cause an attribute of the device to change. Such change information may be propagated to the virtual gateway device 338 (as described below), and the virtual device interface 356 may send a command to the corresponding virtual device 310A-D to cause the same attribute to change on the virtual device 310A-D.

Physical gateway device 320 may have a local network map of devices 376A-D managed by physical gateway device 320. Such information may be part of managed device data 318 maintained by gateway device 320. The managed device data 318 may include a network map that identifies each device 376A-D managed by gateway device 320 as well as the virtual addresses assigned to the virtual devices 310A-D that are virtual representations of the devices. The network map may include unique device identifiers (e.g., MAC addresses) that uniquely identify the devices 376A-D to physical gateway device 320 as well as unique virtual device identifiers (e.g., DSNs) that uniquely identify the virtual devices 310A-D to the virtual gateway device 338. The network map may be implemented as a table, list, database, or other file or data structure. Each entry in the network map may include the unique device identifier of a device, and may also include the unique virtual device identifier of the corresponding virtual device. Entries may also indicate communication protocols supported by the devices (e.g., Zigbee, Bluetooth, etc.), device types, attributes of devices, commands accepted by the devices, and so on.

Virtual gateway device 338 may independently determine that an attribute of a device should be changed (e.g., based on a rule maintained by virtual gateway device 338). Alternatively, virtual gateway device 338 may receive an instruction/request to update an attribute of a device. Such an instruction may be received from a virtual device 310A-D, from a third party service, from a user interface, or from another source. For example, a request may be received by a virtual device 310A-D from a remote control application via a standardized API (or set of protocol agnostic APIs), and then sent to virtual gateway device 338. The same standardized API may be used for communication between the server computing device 305 and the remote control application regardless of whether the remote control application is providing instructions to update a device managed by a gateway device or a device that is not managed by a gateway device. Accordingly, virtual gateway device 338 may forward the instruction to physical gateway device 320.

In one embodiment, instruction generator 346 generates an instruction for the physical gateway device to initiate the attribute update on the physical device and sends the instruction to physical gateway device 320. Alternatively, as mentioned above, virtual gateway device 338 may forward an instruction generated by a virtual device 310A-D to physical gateway device 320. The instruction may contain a virtual device identifier associated with a device 376A-D and an attribute update for that device. The attribute update may be a key value pair including a name or identifier representing the attribute and a value representing a new state for the attribute. Alternatively, the generated instruction may include a physical device identifier (e.g., a MAC address) of the physical device and the attribute update. In one embodiment, instruction generator 346 translates an instruction received from a virtual device 310A-D by replacing the virtual device ID in the instruction with the associated device ID.

Physical device interface 358 sends messages to, and receives messages from, physical gateway device 320. In one embodiment, such messages are sent using a transmission control protocol/internet protocol (TCP/IP) connection.

Physical gateway device 320 includes an IP network interface 364, a processing device 366, additional network interfaces 368A-C and a memory 370. Physical gateway device 320 may also include other components not described herein. IP network interface 364 (also referred to as an IP network adapter) receives messages from, and sends messages to, virtual gateway device 338 over a WAN and/or LAN. IP network interface 364 may be, for example, an Ethernet network adapter, a Wi-Fi network adapter, and so on.

Additional network interfaces 368A-C are wireless or wired adapters that are used to communicate with devices 376A-D managed by physical gateway device 320. Additional network interfaces 368A-C may include a ZigBee module, a Bluetooth module, a power line communication (PLC) module, and/or other wired or wireless communication modules.

Processing device 366 is connected to IP network interface 364, additional network interfaces 368A-C and memory 370. Processing device 366 may represent one or more general-purpose processors such as a microprocessor, central processing unit, or the like. Processing device 366 may also be one or more special-purpose processing devices such as an application specific integrated circuit (ASIC), a field programmable gate array (FPGA), a digital signal processor (DSP), network processor, or the like. Processing device 366 is configured to execute instructions for performing the operations and steps discussed herein. The instructions in one embodiment include an instruction parser 372, a command generator 374, a response generator 380 and a device discovery module 382. Such instructions may also reside in memory 370, and may be loaded into processing device 366 during operation of physical gateway device 320. Memory 370 may include volatile and/or nonvolatile memory devices, such as Flash, random access memory (RAM), read only memory (ROM), and so forth.

As mentioned previously, physical gateway device 320 may include a definition of types of devices that may be managed by the gateway device, the device attributes of these devices, and/or how to communicate with or control these devices. Additionally, physical gateway device 320 may include a local data storage (e.g., memory 370) with information on a local network managed by the gateway device (e.g., including information on all of the local devices managed by the gateway, how to communicate with these devices, capabilities (e.g., device attributes) of these devices (e.g., communication protocol and device ID), etc.). All such data may be included in managed device data 318. Accordingly, each instruction generated by instruction generator 346 may contain minimal information such as a virtual device ID and an attribute update. Additional types of instructions other than instructions for attribute updates may also be sent, such as instructions for status updates, connectivity status updates, instructions to perform device management operations (e.g., to perform a factory reset), and so on.

Upon receipt of an instruction from virtual gateway device 338, instruction parser 372 parses the instruction to determine the virtual device ID and the attribute update (or other type of instruction). Command generator 374 may then perform a lookup in the managed device data 318 to determine a device ID of the physical device associated with the virtual device ID, a communication protocol used by the physical device, and so on. The command generator 274 may additionally determine what type of command to generate, packets to include in the command, how to structure the command, an attribute to be modified by the command, a new value for the attribute, and so on. Command generator 374 may than use the determined information to generate the command. The generated command may have a format that is based at least in part on the communication protocol that will be used to send the command to the device 376A-D. Once the command is generated, command generator 374 may send the command to the appropriate device 376A-D via an appropriate additional network interface 368A-C. For example, if a command is to be sent to a Zigbee device, then an additional device interface 368A-C with a Zigbee module may send the command to the Zigbee device. The device 376A-D may execute the command, which may cause the device to change an attribute of the device 378A-D in accordance with the command.

After a device 376A-D executes a command (or fails to execute a command), the device sends a response back to physical gateway device 320. The response may have a first format based on a communication protocol used by the device 376A-D and includes a device ID of that device 376A-D. Physical gateway device 320 may then generate a new response based on the received response, and send the new response to virtual gateway device 338. The new response has a second format based on a standardized API provided by virtual gateway device 338. The new response would have the same format regardless of the communication protocol used by the device 376A-D. Additionally, the new response may identify the device 376A-D using the virtual device ID associated with that device.

In one embodiment, an instruction received by physical gateway device 320 from virtual gateway device 338 includes a unique instruction identifier. The instruction identifier may be a monotonically increasing value, a random value, or some other value assigned to the instruction that can be used to distinguish that instruction from other instructions. Response generator 380 may temporarily store the instruction identifier until a response to a command is received from a device that the command was directed to. Response generator 380 may then add the instruction identifier to the new response. Therefore, when the virtual gateway device 338 receives the response, it can determine which instruction the response is responsive to and then update the appropriate virtual device (if the virtual device was not already updated).

Device discovery module 382 is responsible for performing device discovery. When a device has not been paired with any gateway device, that device may transmit a pair request or commissioning request, which may include attribute information about the device and a unique device identifier of the device. Device discovery module 382 detects such a pair/commissioning request, and pairs to or commissions the device 338. Device discovery module 382 additionally sends the device ID to virtual gateway device 338. Server computing device 305 may then generate a new virtual device that is a virtual representation of the physical device, and may assign a virtual device ID to the virtual device. Virtual gateway device 338 then reports the virtual device ID back to physical gateway device 320. Physical gateway device 320 may then add the virtual device ID to managed device data 318. Thereafter, all communications between the virtual gateway device and the physical gateway device 320 that are associated with the physical device may use the virtual device ID assigned to the virtual device that is a virtual representation of the physical device.

In one embodiment, additional network interfaces 368A-C and the device 376A-D utilize different pairing procedures. For example, additional networking interface 368A and devices 376A-B may use procedures for pairing according to the Bluetooth protocol, while additional networking interface 368B and device 376C may use procedures for commissioning according to the ZigBee protocol, and additional networking interface 368C and device 376D may use procedures for pairing or commissioning according to yet another protocol. In this manner, physical gateway device 320 may pair or commission to devices 376A-D of differing protocols through the corresponding additional networking interfaces 368A-C.

FIGS. 4A-7 are flow diagrams showing various methods of implementing a virtual gateway device to augment and control the functionality of a physical device and of a physical gateway device that operates on instructions from a virtual gateway device. The methods may be performed by processing logic that may comprise hardware (e.g., circuitry, dedicated logic, programmable logic, microcode, etc.), software (e.g., instructions run on a processing device to perform hardware simulation), or a combination thereof. Various embodiments may be performed by a server computing device executing a virtual gateway device (e.g., server computing device 125 of FIG. 1). Other embodiments may be performed by a physical gateway device that is associated with a virtual gateway device.

Figure 4A:
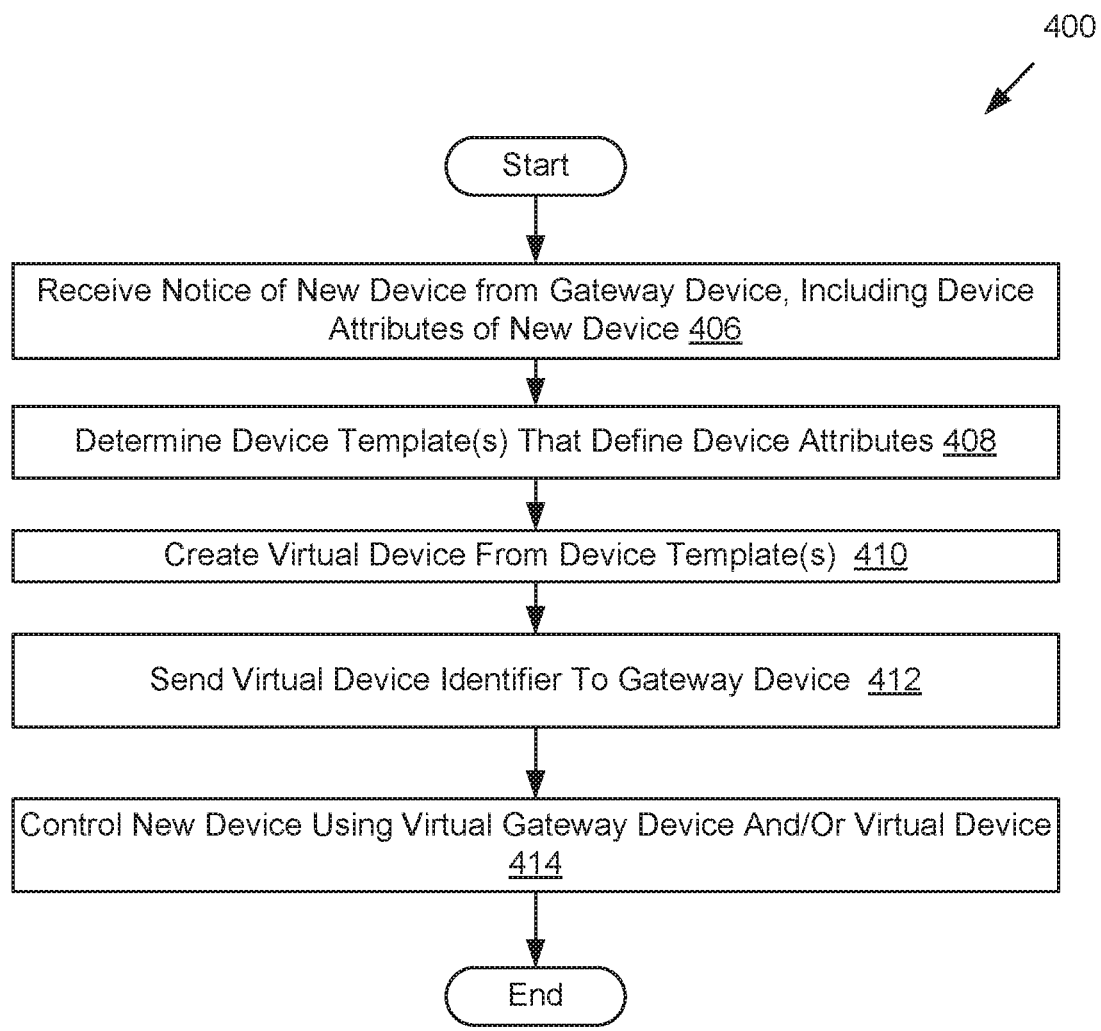
FIG. 4A is a flow chart of one embodiment for a method of pairing a gateway device to a new device using a virtual gateway device.

FIG. 4A is a flow chart of one embodiment for a method 400 of creating a virtual device for a new device that is paired to a gateway device. At block 406, processing logic receives a notice of a new device from the gateway device. The notice may include attributes of the new device as well as a unique identifier (e.g., MAC address or other network address) of the new device. At block 408, processing logic determines device templates that define the attributes of the new device.

At block 410, processing logic creates a virtual device from the determined device templates. This may include assigning a unique virtual device identifier (e.g., DSN) to the virtual device. The created virtual device may be added to a virtual device network that includes a parent child relationship between the virtual gateway device (acting as a parent node) and the virtual devices (acting as child nodes).

At block 412, processing logic may send a report of the unique virtual device ID to the gateway device. The report may additionally include the device ID of the device. This may enable the device to associate the virtual device ID with the device ID in a table or other data structure (e.g., a mapping table identifying devices in a network managed by the gateway device). In an alternative embodiment, the virtual gateway device maintains the mapping information that maps the virtual device ID to the device ID of the device. In such an embodiment, the virtual gateway device may use the device ID rather than the virtual device ID when sending instructions associated with the device to the physical gateway device.

At block 414, processing logic then controls the new device using the virtual gateway device and the virtual device.

Figure 4B:
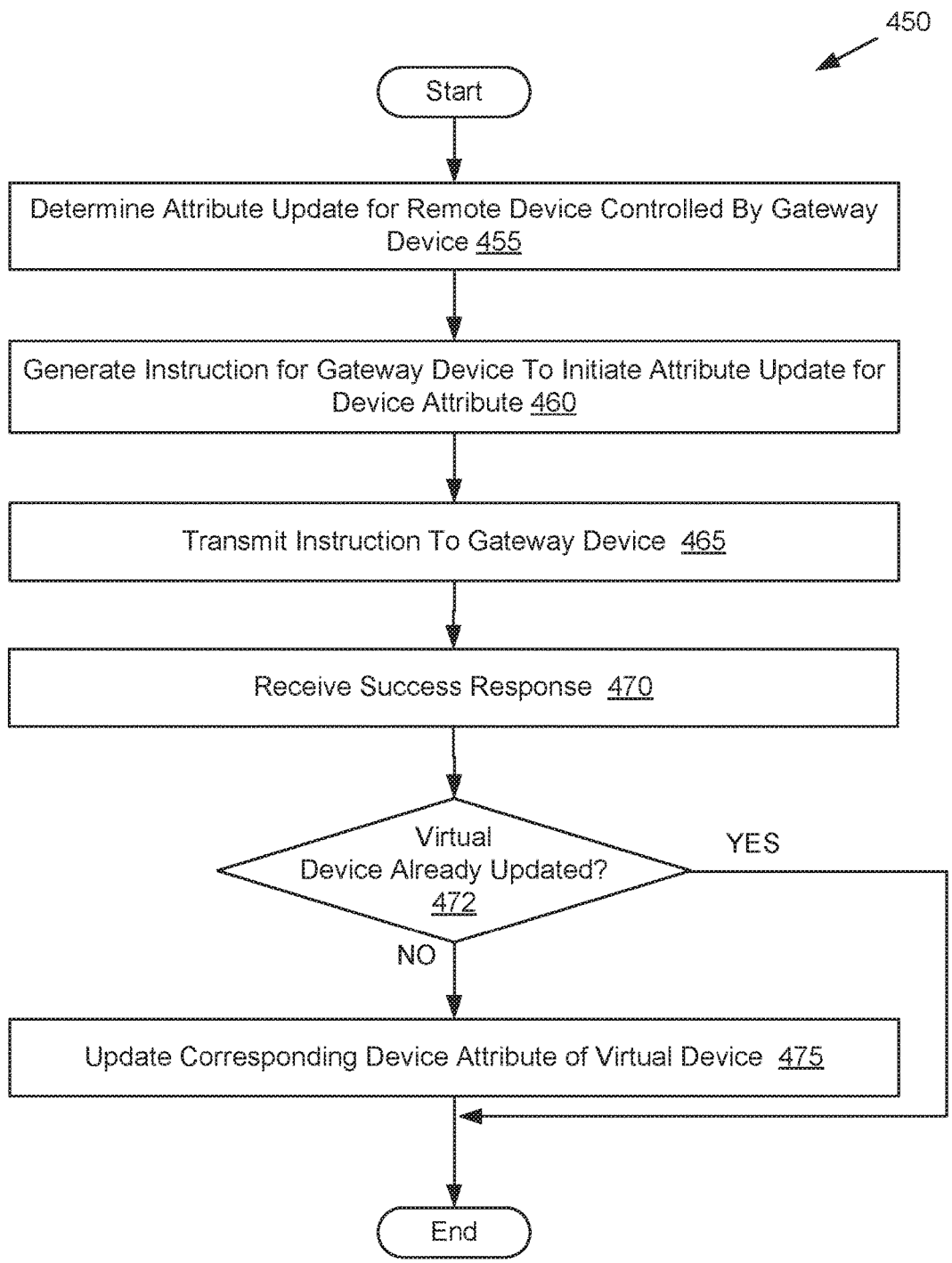
FIG. 4B is a flow chart of one embodiment for a method of using a virtual gateway device to control a physical gateway device.

FIG. 4B is a flow chart of one embodiment for a method 450 of using a virtual gateway device to control a physical gateway device. At block 455 of method 450, processing logic determines an attribute update for a remote device controlled by a gateway device. In one embodiment, processing logic receives an instruction to perform the attribute update from a virtual device associated with the remote device. Alternatively, processing logic may determine the attribute update based on a rule or schedule. For example, a schedule may indicate that a device is to turn on at a specified time.

At block 460, processing logic generates an instruction for the gateway device. The instruction may be an instruction to initiate an attribute update for a device attribute of the remote device. The instruction may include a virtual device ID of a virtual device associated with the instruction and an attribute update. The instruction may have the same format regardless of whether the instruction is for a device managed by a gateway device or a device that is not managed by a gateway device. Moreover, the instruction has a standardized format that is the same regardless of an underlying technology that a gateway device uses to communicate with the remote device. In one embodiment, the instruction is encoded as a JSON embedded string or other string. In one embodiment, the instruction is generated by a virtual device rather than a virtual gateway device.

At block 465, processing logic transmits the instruction to the gateway device. At block 470, processing logic receives a response that the instruction was successful (e.g., that the attribute update was successfully performed on the remote device). At block 472, processing logic determines whether the virtual device corresponding to the remote device has already been updated to reflect the attribute update on the remote device. In a best effort implementation, the attribute may be updated on the virtual device before or in parallel with updating of the attribute on the physical device. In such an implementation, the method ends after receiving the success response. In an update upon confirmation scenario, the virtual device is not updated until a success response is received. In such a scenario, after receiving the success response the method continues to block 475. Processing logic then updates the corresponding device attribute of the virtual device at block 475. The method then ends.

Figure 5:
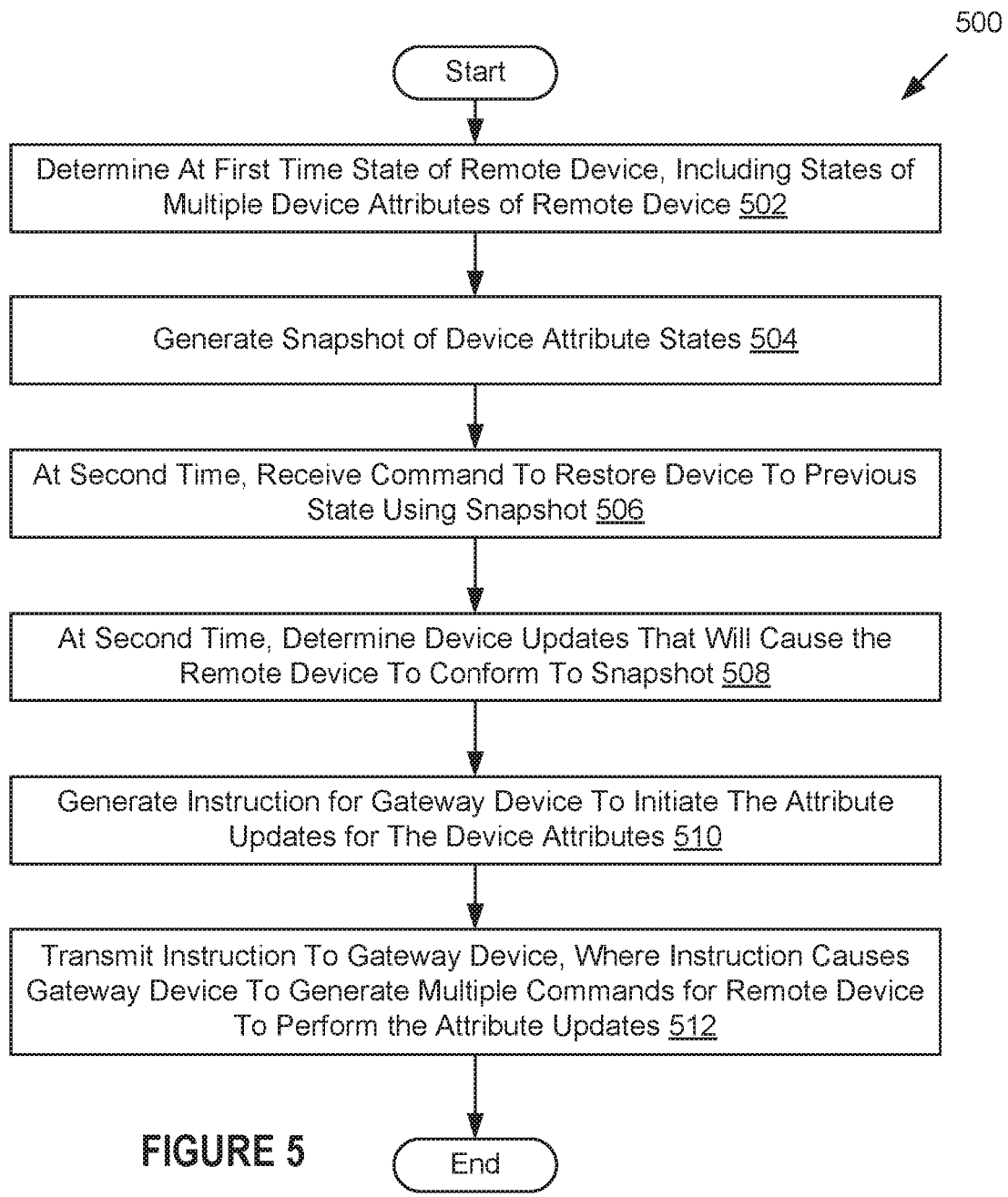
FIG. 5 is a flow chart of one embodiment for a method of acquiring, storing and applying a snapshot of a device's attribute states.

FIG. 5 is a flow chart of one embodiment for a method 500 of acquiring, storing and applying a snapshot of a device's attribute states. Method 500 may be applied regardless of an underlying technology (e.g., an underlying communication protocol) used by the device, whether or not the underlying technology supports snapshots. At block 502 of method 500, processing logic determines at a first time states of multiple device attributes of a remote device. The states of each device attribute may be reflected in the states of a virtual device that is a virtual representation of that remote device. Accordingly, the states of the attributes for the remote device may be determined from the states of the device attributes for the virtual device. At block 504, processing logic generates a snapshot of the device attribute states of the virtual device. The snapshot may be a file or data structure that includes a set of key value pairs, where each key represents an attribute, and each value represents an attribute value.

At block 506, at a second time processing logic determines to restore the remote device to the state of the snapshot. For example, a user may send a command to revert to the snapshot, or the determination can be made based on a rule or schedule. At block 508, processing logic determines device attribute updates that will cause the remote device to conform to the snapshot.

At block 510, processing logic generates an instruction (or multiple instructions) for the gateway device to initiate the device attribute updates for the device attributes on the remote device. At block 512, processing logic transmits the instruction (or instructions) to the gateway device. The instruction (or instructions) will cause the gateway device to generate one or multiple commands for the remote device to perform the attribute updates. The remote device will then have the same state as the state shown in the snapshot. Note that the states of the device attributes in the virtual device corresponding to the remote device would also be updated, either using a best effort implementation or an upon confirmation implementation.

In embodiments method 500 can be applied to multiple devices, which may have the same or different underlying technologies (e.g., underlying communication protocols). Accordingly, a snapshot may be a snapshot of the states of multiple different devices. The snapshot can later be used to revert all of the devices represented in the snapshot to the states that they had when the snapshot was generated.

Figure 6:
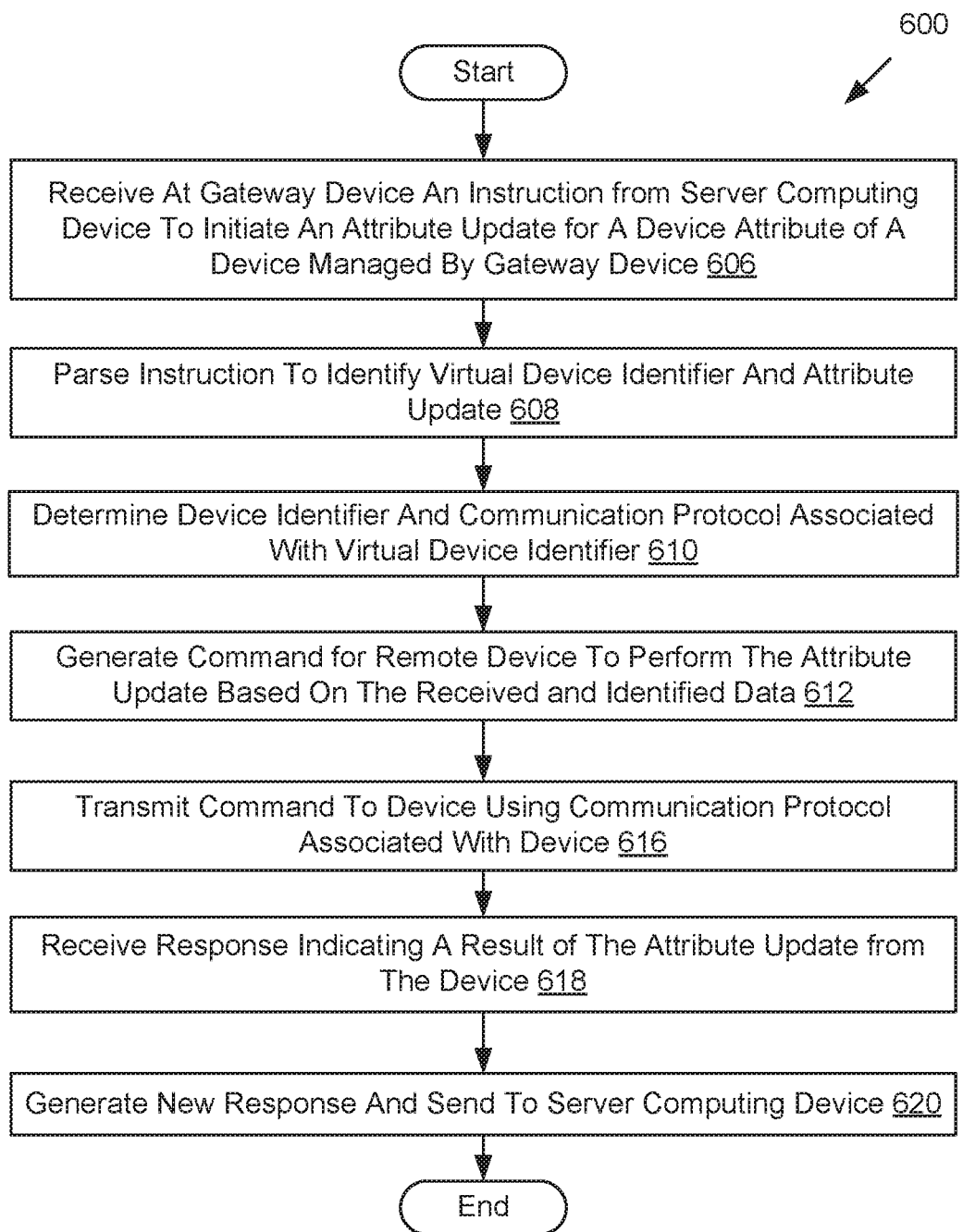
FIG. 6 is a flow chart of one embodiment for a method of controlling a device by a gateway device based on information received from a virtual gateway device.

FIG. 6 is a flow chart of one embodiment for a method 600 of controlling a device by a gateway device based on information received from a virtual gateway device. At block 606 of method 600, a gateway device receives an instruction from a server computing device to initiate an attribute update for a device attribute of a device managed by the gateway device. At block 608, the gateway device parses the instruction to determine a virtual device identifier and an attribute update included in the instruction. The virtual device identifier may be used by the virtual gateway device to uniquely identify the device. In one embodiment, the instruction is encoded or has a particular format (e.g., as a JSON encoded string). In such an embodiment, processing logic may decode the instruction before parsing it.

At block 610, processing logic determines a device identifier and a communication protocol based on the virtual device identifier. In one embodiment, the gateway device includes a table of managed devices. Each entry in the table may include a device ID (e.g., a MAC address or other device identifier), a virtual device ID and a communication protocol. The format of the device ID may be dependent on the communication protocol used to communicate with the device. For example, Bluetooth uses a different addressing mechanism for uniquely identifying devices than Zigbee.

At block 612, processing logic determines a command that will cause the device to perform the attribute update. The data in the command (e.g., the specific packets of the command) may vary based on the type of device to be controlled, the communication protocol used by the device, and/or the attribute to be modified. Processing logic may determine, based on the table and/or other managed device information, a type of device to be updated, an attribute to be updated, etc. Processing logic may determine an appropriate command to cause the device to perform the update on the specified attribute. Processing logic then generates a command to perform the attribute update. A format of the command may be based at least in part on the communication protocol used by the device to which the command will be sent. A command generated for a Zigbee device may have a different format, for example, than a command generated for a Bluetooth device. In a ZigBee example, the command may include a MAC address, a cluster ID, an attribute ID, a command ID and/or one or more command packets.

At block 616, processing logic transmits the command to the device using the communication protocol associated with the device (e.g., using ZigBee or Bluetooth). At block 618, the gateway device receives a response from the device. The response may indicate a success or failure of the attribute update. At block 618, processing logic generates a new response based on the received response, and sends the new response to the server computing device (e.g., to a virtual gateway device running on the server computing device). In one embodiment, processing logic determines an instruction identifier included in the received instruction and adds the instruction identifier to the new response.

Figure 7:
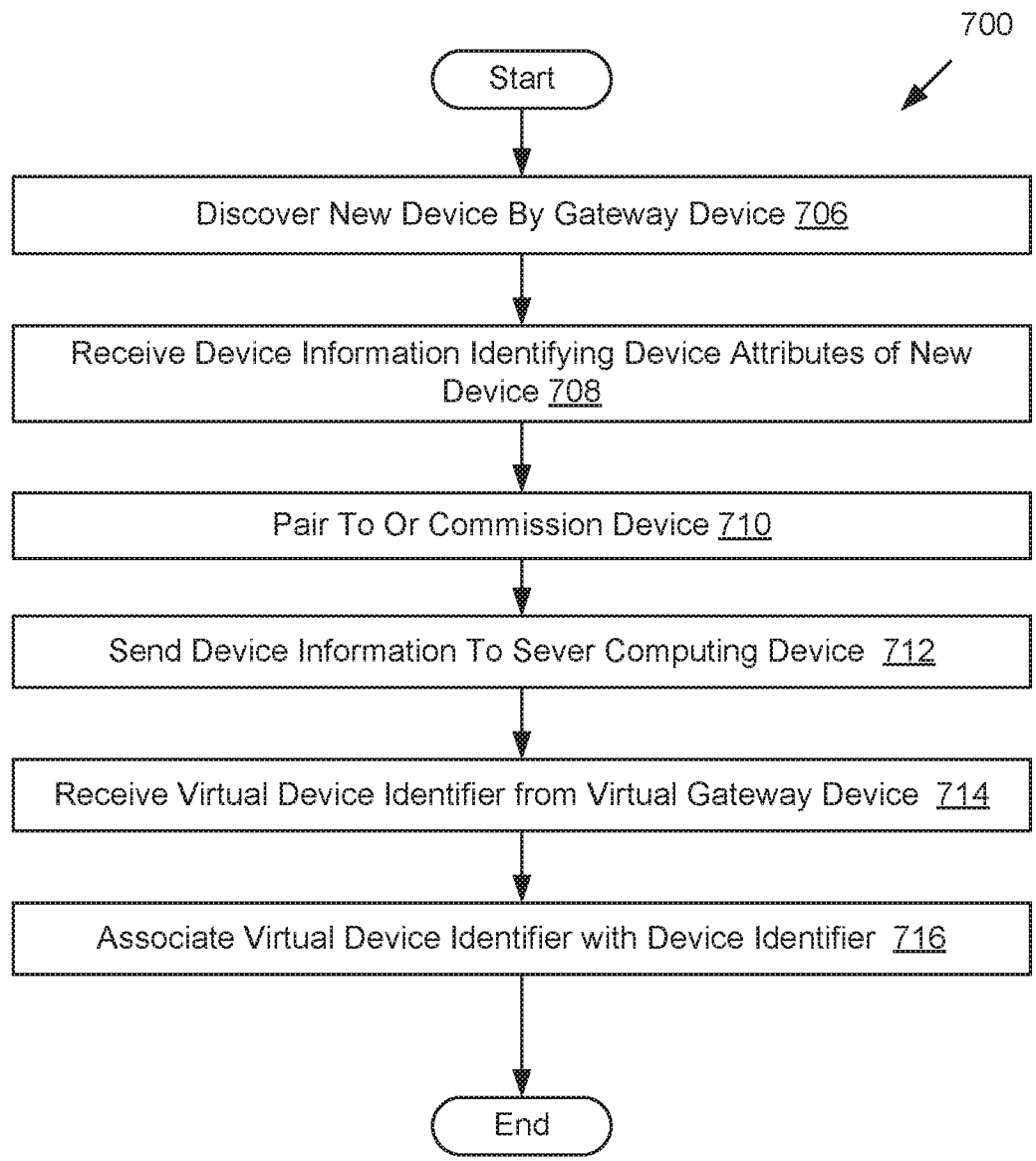
FIG. 7 is a flow chart of one embodiment for a method of pairing to or commissioning a new device.

FIG. 7 is a flow chart of one embodiment for a method 700 of pairing to or commissioning a new device by a gateway device. At block 706 of method 700, a gateway device discovers a new device. Device discovery may be automatic (e.g., scheduled to occur periodically or initiated upon receipt of a pairing/commissioning request) or initiated by a user (e.g., through a GUI available to the user or a button of the gateway device). At block 708, the gateway device receives device information from the new device. The device information may include a device identifier used to uniquely identify the device as well as information identifying device attributes of the new device.

At block 710, processing logic pairs to (or commissions) the device. This may include adding an entry for the device to a table maintained by processing logic, exchanging keys and/or security information, and so on. The entry may include the device ID of the device, a communication protocol used by the device, and/or additional information.

At block 712, the gateway device generates a message that includes the device information and/or a result of the pairing. The gateway device then sends the message to a virtual gateway device running in a server computing device. At block 714, the gateway device receives a virtual device ID for the new device from the virtual gateway device. At block 716, processing logic associates the virtual device ID with the device ID. This may include adding the virtual device ID to the entry in the table for the new device. Accordingly, the entry may include the device ID, virtual device ID and communication protocol, and may be used to translate between an addressing mechanism used by the virtual gateway device and an addressing mechanism used by the new device.

Device identifiers may be hexadecimal, alphanumeric, or numbered identifiers. For example, in ZigBee, the identifier is an 8 byte MAC address, in Z-Wave, the identifier is a 1 byte Node ID, and in Bluetooth, the identifier is a 6 byte address (e.g. Bluetooth Low Energy (BLE)). Each communication protocol may apply different standards for uniquely identifying devices. Accordingly, a first device identifier for a first device that uses a first communication protocol may conform to a different standard that a second device identifier for a second device that uses a second communication protocol.

Figure 8:
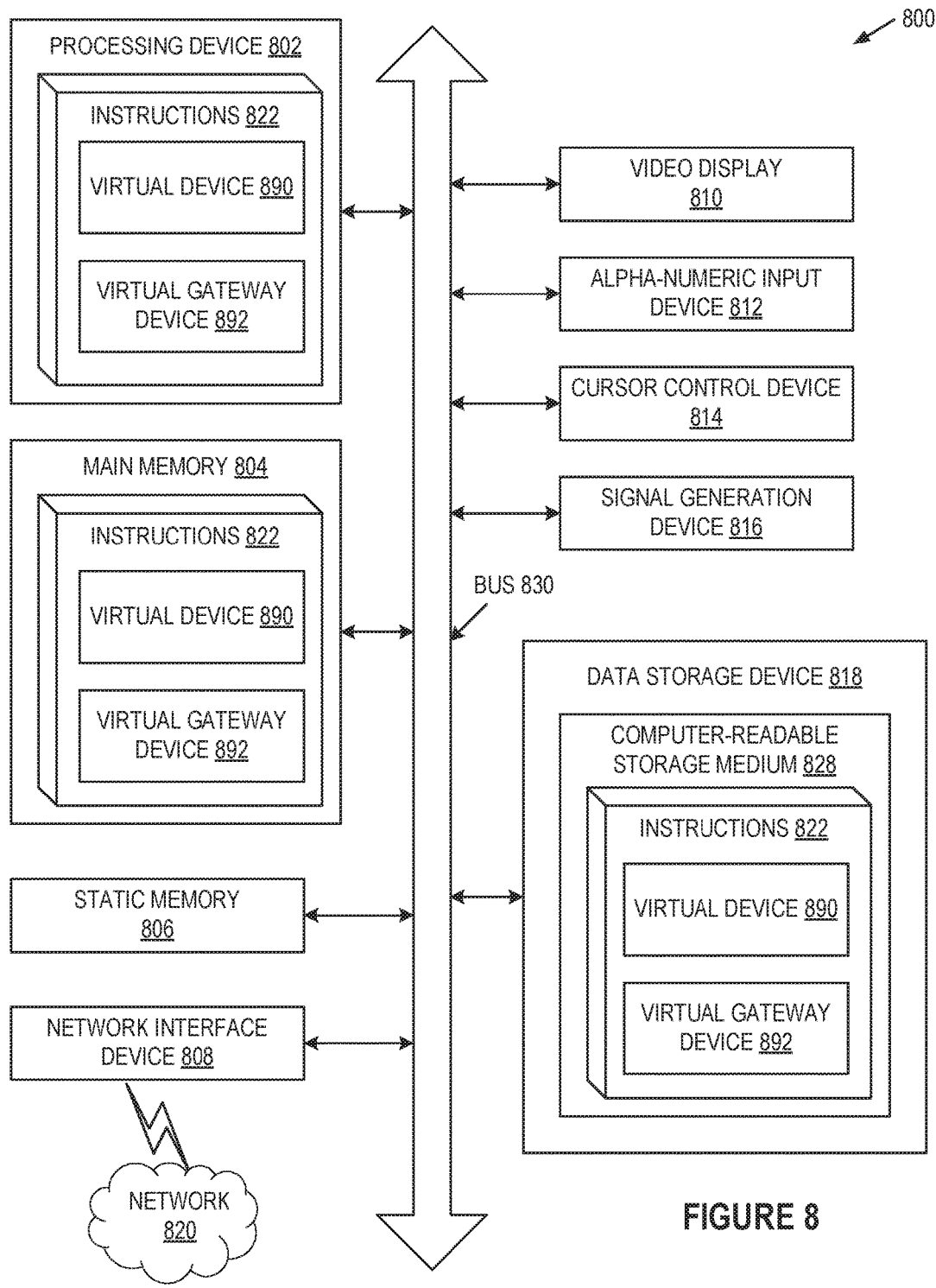
FIG. 8 illustrates a block diagram of one embodiment of a computing device.

FIG. 8 illustrates a diagrammatic representation of a machine in the example form of a computing device 800 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory (e.g., a data storage device 818), which communicate with each other via a bus 830.

Processing device 802 represents one or more general-purpose processors such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute the processing logic (instructions 822) for performing the operations and steps discussed herein.

The computing device 800 may further include a network interface device 808 for communicating to a network 820. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-readable storage medium (or more specifically a computer-readable storage medium) 828 on which is stored one or more sets of instructions 822 embodying any one or more of the methodologies or functions described herein. The instructions 822 may also reside, completely or at least partially, within the main memory 804 and/or within the processing device 802 during execution thereof by the computer system 800, the main memory 804 and the processing device 802 also constituting computer-readable storage media.

The computer-readable storage medium 828 may also be used to store a virtual device 890 and/or a virtual gateway device 892 (as described with reference to FIG. 3), and/or a software library containing methods that call a virtual device 890 and/or virtual gateway device 892. While the computer-readable storage medium 828 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

The modules, components and other features described herein (for example in relation to FIGS. 1-3) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "determining", "generating", "sending", "receiving", "translating", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:

receiving, by remote server executing a virtual gateway device associated with a multi-radio gateway device, a request to initiate a first attribute update for a first device managed by the multi-radio gateway device;

generating, by the virtual gateway device, a first instruction to initiate the first attribute update for the first device, the first instruction having a first format that is not associated with a first communication protocol used by the first device;

sending, by the virtual gateway device, the first instruction to the multi-radio gateway device associated with the virtual gateway device;

receiving, by the multi-radio gateway device, the first instruction from the virtual gateway device of the remote server to initiate the first attribute update for the first device managed by the multi-radio gateway device, wherein the multi-radio gateway device supports a plurality of types of wireless communication protocols for communication with one or more devices connected to the multi-radio gateway device, the one or more devices including the first device;

determining, by the multi-radio gateway device, the first attribute update and a first virtual device identifier associated with the first device from the first instruction, wherein the first virtual device identifier is used by the remote server to uniquely identify the first device;

determining, by the multi-radio gateway device based at least in part on the first virtual device identifier, the first communication protocol from the plurality of types of wireless communication protocols supported by the multi-radio gateway device and a first device identifier used by the multi-radio gateway device to uniquely identify the first device;

generating, by the multi-radio gateway device, a first command for the first device to perform the first attribute update, the first command having a second format based at least in part on the first communication protocol; and sending the first command to the first device.

2. The method of claim 1, further comprising:

receiving, by the multi-radio gateway device, the first device identifier from the first device;

sending, by the multi-radio gateway device, the first device identifier to the virtual gateway device of the remote server;

receiving, by the multi-radio gateway device, the first virtual device identifier from the virtual gateway device of the remote server; and associating, by the multi-radio gateway device, the first virtual device identifier with the first device identifier.

3. The method of claim 2, wherein associating the first device identifier with the first virtual device identifier comprises:

adding, by the multi-radio gateway device, an entry to a table, the entry comprising the first device identifier, the first virtual device identifier, and the first communication protocol.

4. The method of claim 2, further comprising:

receiving, by the multi-radio gateway device and from the first device, information identifying one or more first device attributes of the first device;

pairing, by the multi-radio gateway device, the multi-radio gateway device to the first device; and sending, by the multi-radio gateway device, the information to the virtual gateway device of the remote server.

5. The method of claim 1, wherein the first instruction comprises a first unique instruction identifier, the method further comprising:

receiving, by the multi-radio gateway device and from the first device, a first response to the first command comprising a result of the first attribute update and the first device identifier;

determining, by the multi-radio gateway device, the first unique instruction identifier based on the first instruction;

generating, by the multi-radio gateway device, a second response, the second response comprising the first virtual device identifier, the result of the first attribute update, and the first unique instruction identifier; and sending, by the multi-radio gateway device, the second response to the virtual gateway device of the remote server.

6. The method of claim 1, wherein the first format comprises an encoded string comprising the first virtual device identifier and a key value pair representing the first attribute update.

7. The method of claim 1, further comprising:

receiving, by the multi-radio gateway device, a second instruction from the virtual gateway device of the remote server to initiate a second attribute update for a second device managed by the multi-radio gateway device, the second instruction having the first format that is not associated with a second communication protocol used by the second device;

determining, by the multi-radio gateway device, the second attribute update and a second virtual device identifier associated with the second device from the second instruction, wherein the second virtual device identifier is used by the virtual gateway device of the remote server to uniquely identify the second device;

determining, by the multi-radio gateway device, the second communication protocol and a second device identifier used by the multi-radio gateway device to uniquely identify the second device based at least in part on the second virtual device identifier;

generating, by the multi-radio gateway device, a second command for the second device to perform the second attribute update, the second command having a third format based at least in part on the second communication protocol; and sending, by the multi-radio gateway device, the second command to the second device.

8. The method of claim 7, wherein the first communication protocol is a first one of Bluetooth, ZigBee, or Z-Wave and wherein the second communication protocol is a second one of Bluetooth, ZigBee, or Z-Wave.

9. A method comprising:

executing, by a server computing device, a virtual gateway device associated with a multi-radio gateway device, the multi-radio gateway device supporting a plurality of types of wireless communication protocols for communication with one or more devices connected to the multi-radio gateway device;

receiving, by the virtual gateway device and from the multi-radio gateway device, a first device identifier of a first device managed by the multi-radio gateway device, wherein the first device identifier is used by the multi-radio gateway device to uniquely identify the first device, the one or more devices including the first device;

receiving, by the virtual gateway device and from the multi-radio gateway device, a first plurality of device attributes of the first device;

generating, by the virtual gateway device, a first virtual device identifier for the first device, wherein the first virtual device identifier is used by the virtual gateway device of the server computing device to uniquely identify the first device and is to be used by the multi-radio gateway device to identify a first communication protocol for the first device from the plurality of types of wireless communication protocols supported by the multi-radio gateway device;

generating, by virtual gateway device of the server computing device, a first virtual device based at least in part on the first plurality of device attributes of the first device;

assigning, by the virtual gateway device, the first virtual device identifier to the first virtual device; and sending, by the virtual gateway device, the first virtual device identifier to the multi-radio gateway device.

10. The method of claim 9, further comprising:
sending, by the virtual gateway device, the first virtual device identifier to a mobile device, wherein the mobile device uses the first virtual device identifier to control the first virtual device.

11. The method of claim 9, further comprising:
determining, by the virtual gateway device, a first attribute update for a first device attribute of the first plurality of device attributes;

generating, by the virtual gateway device, a first instruction for the multi-radio gateway device to initiate the first attribute update for the first device attribute, the first instruction comprising the first virtual device identifier and a key value pair representing the first attribute update; and sending, by the virtual gateway device, the first instruction to the multi-radio gateway device.

12. The method of claim 9, further comprising:
receiving, by the virtual gateway device and from the multi-radio gateway device, a second device identifier of a second device managed by the multi-radio gateway device, wherein the second device identifier is used by the multi-radio gateway device to uniquely identify the second device and conforms to a different standard than the first device identifier;

receiving, by the virtual gateway device and from the multi-radio gateway device, a second plurality of device attributes of the second device;

generating, by the virtual gateway device, a second virtual device identifier for the second device, wherein the second virtual device identifier is used by the virtual gateway device to uniquely identify the second device and has a same format as the first virtual device identifier;

generating, by the virtual gateway device, a second virtual device based at least in part on the second plurality of device attributes of the second device;

assigning, by the virtual gateway device, the second virtual device identifier to the second virtual device; and sending, by the virtual gateway device, the second virtual device identifier to the multi-radio gateway device.

13. The method of claim 12, further comprising:
determining, by the virtual gateway device, a second attribute update for a second device attribute of the second plurality of device attributes;

generating, by the virtual gateway device, a second instruction for the multi-radio gateway device to initiate the second attribute update for the second device attribute, the second instruction comprising the second virtual device identifier and a key value pair representing the second attribute update; and sending, by the virtual gateway device, the second instruction to the multi-radio gateway device.

14. A system, comprising:
a remote server computing device executing a virtual gateway device associated with a multi-radio gateway device, wherein the virtual gateway device is to:
  receive a request to initiate a first attribute update for a first device managed by the multi-radio gateway device;
  generate a first instruction to initiate the first attribute update for the first device, the first instruction having a first format that is not associated with a first communication protocol used by the first device; and
  send the first instruction to the multi-radio gateway device associated with the virtual gateway device; and the multi-radio gateway device supporting a plurality of types of wireless communication protocols for communication with one or more devices connected to the multi-radio gateway device, the multi-radio gateway device comprising:
  a first interface to connect to an internet protocol (IP) network;
  a second interface having a first communication protocol to connect to the one or more devices, the one or more devices including the first device; and
  a processing device, connected with the first interface and the second interface, the processing device to:
    receive the first instruction from the virtual gateway device of the remote server via the first interface;
    determine the first attribute update and a first virtual device identifier associated with the first device from the first instruction, wherein the first virtual device identifier is used by the virtual gateway device of the remote server to uniquely identify the first device;
    determine, based at least in part on the first virtual device identifier, the first communication protocol from the plurality of types of wireless communication protocols supported by the multi-radio gateway device and a first device identifier used by the multi-radio gateway device to uniquely identify the first device based at least in part on the first virtual device identifier;
    generate a first command for the first device to perform the first attribute update, the first command having a second format based at least in part on the first communication protocol; and
    send the first command to the first device via the second interface.

15. The system of claim 14, the multi-radio gateway device further comprising:

a third interface having a second communication protocol to connect to one or more additional devices;

the processing device further connected to the third interface, the processing device further to:

receive a second instruction from the virtual gateway device of the remote server via the first interface, wherein the second instruction is to initiate a second attribute update for a second device of the one or more additional devices;

determine the second attribute update and a second virtual device identifier associated with the second device from the second instruction, wherein the second virtual device identifier is used by the virtual gateway device of the remote server to uniquely identify the second device, the second virtual device identifier having a same format as the first virtual device identifier;

determine the second communication protocol and a second device identifier used by the multi-radio gateway device to uniquely identify the second device based at least in part on the second virtual device identifier, wherein the second device identifier conforms to a different standard than the first device identifier;

generate a second command for the second device to perform the second attribute update, the second command having a third format based at least in part on the second communication protocol; and send the second command to the second device via the third interface.

16. The system of claim 14, the processing device of the multi-radio gateway device further to:

receive the first device identifier and information identifying one or more first device attributes of the first device via the second interface;

pair with the first device;

send the information and the first device identifier to the virtual gateway device of the remote server via the first interface;

receive the first virtual device identifier from the virtual gateway device of the remote server via the first interface; and associate the first virtual device identifier with the first device identifier.

17. The system of claim 16, wherein to associate the first device identifier with the first virtual device identifier the processing device of the multi-radio gateway device is to:

add an entry to a table, the entry comprising the first device identifier, the first virtual device identifier, and the first communication protocol.

18. A computer readable storage medium comprising instructions that, when executed by a processing device, cause the processing device to perform operations comprising:

executing, by the processing device, a virtual gateway device associated with a multi-radio gateway device, the multi-radio gateway device supporting a plurality of types of wireless communication protocols for communication with one or more devices connected to the multi-radio gateway device;

receiving, by the processing device executing the virtual gateway device and from the multi-radio gateway device, a first device identifier of a first device managed by the multi-radio gateway device, wherein the first device identifier is used by the multi-radio gateway device to uniquely identify the first device, the one or more devices including the first device;

receiving, by the virtual gateway device and from the multi-radio gateway device, a first plurality of device attributes of the first device;

generating, by the processing device executing the virtual gateway device, a first virtual device identifier for the first device, wherein the first virtual device identifier is used by the virtual gateway device to uniquely identify the first device;

generating, by the processing device executing the virtual gateway device, a first virtual device based at least in part on the first plurality of device attributes of the first device and is to be used by the multi-radio gateway device to identify a first communication protocol for the first device from the plurality of types of wireless communication protocols supported by the multi-radio gateway device;

assigning, by the virtual gateway device, the first virtual device identifier to the first virtual device; and sending, by the virtual gateway device, the first virtual device identifier to the multi-radio gateway device.

19. The computer readable storage medium of claim 18, further comprising:

determining, by the virtual gateway device, a first attribute update for a first device attribute of the first plurality of device attributes;

generating, by the virtual gateway device, a first instruction for the multi-radio gateway device to initiate the first attribute update for the first device attribute, the first instruction having a first format that is not associated with a first communication protocol used by the first device, wherein the first instruction comprises the first virtual device identifier and a representation of the first attribute update; and sending, by the virtual gateway device, the first instruction to the multi-radio gateway device.

20. The computer readable storage medium of claim 19, further comprising:

determining, by the virtual gateway device, a second attribute update for a second device attribute of a second device that uses a second communication protocol that is different from the first communication protocol;

generating, by the virtual gateway device, a second instruction for the multi-radio gateway device to initiate the second attribute update for the second device attribute, the second instruction having the first format that is not associated with the second communication protocol used by the second device, wherein the second instruction comprises a second virtual device identifier and a representation of the second attribute update; and sending, by the virtual gateway device, the second instruction to the multi-radio gateway device.

\* \* \* \* \*